United States Patent
Son et al.

(10) Patent No.: US 9,672,796 B2
(45) Date of Patent: Jun. 6, 2017

(54) ELECTRONIC DEVICE INCLUDING FLEXIBLE DISPLAY

(75) Inventors: Howon Son, Seoul (KR); Hyorim Park, Seoul (KR); Dami Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/399,500

(22) Filed: Feb. 17, 2012

(65) Prior Publication Data

US 2013/0215088 A1    Aug. 22, 2013

(51) Int. Cl.
| | |
|---|---|
| G09G 5/40 | (2006.01) |
| G06F 3/0489 | (2013.01) |
| G06F 3/0487 | (2013.01) |
| G06F 3/0488 | (2013.01) |
| G06F 1/16 | (2006.01) |
| G09G 5/08 | (2006.01) |

(52) U.S. Cl.
CPC ............. *G09G 5/40* (2013.01); *G06F 3/0487* (2013.01); *G06F 3/0488* (2013.01); *G06F 3/04897* (2013.01); *G06F 1/1652* (2013.01); *G06F 2203/04102* (2013.01); *G06F 2203/04804* (2013.01); *G09G 5/08* (2013.01); *G09G 2340/045* (2013.01); *G09G 2380/02* (2013.01)

(58) Field of Classification Search
CPC . G06F 2203/04102; G06F 2203/04804; G06F 3/0487; G06F 3/0488; G06F 3/04897; G06F 1/1652; G09G 2340/045; G09G 2380/02; G09G 5/08; G09G 5/40

USPC ........................................................ 345/204
See application file for complete search history.

(56) References Cited

U.S. PATENT DOCUMENTS

| | | | | |
|---|---|---|---|---|
| 5,949,432 | A | * | 9/1999 | Gough ................. G06F 3/0481 345/629 |
| 7,109,967 | B2 | | 9/2006 | Hioki et al. |
| 7,274,413 | B1 | * | 9/2007 | Sullivan ............ G02F 1/133305 349/151 |
| 7,443,380 | B2 | | 10/2008 | Nozawa |
| 7,456,823 | B2 | * | 11/2008 | Poupyrev ................. G06F 3/011 178/18.06 |
| RE41,922 | E | * | 11/2010 | Gough ................. G06F 3/0481 345/629 |
| 7,880,718 | B2 | | 2/2011 | Cradick et al. |
| 7,907,200 | B2 | * | 3/2011 | Yanagisawa ....... G02B 27/0101 345/7 |
| RE44,241 | E | * | 5/2013 | Gough ................. G06F 3/0481 345/156 |
| 8,587,539 | B2 | | 11/2013 | Tziortzis et al. |
| 8,610,663 | B2 | * | 12/2013 | Kim ........................ G06F 3/033 345/156 |
| 9,052,769 | B2 | * | 6/2015 | Choi ..................... G06F 3/0414 |

(Continued)

*Primary Examiner* — Michael J Jansen, II
(74) *Attorney, Agent, or Firm* — Birch, Stewart, Kolasch & Birch, LLP

(57) ABSTRACT

An electronic device includes a flexible display, a sensing unit configured to obtain bending information including at least one of a bending degree, the number of times of bending, a bending maintaining duration, and a bending speed of the display, and a controller configured to additionally display a second image on the display when the display is bent in a state in which a first image is displayed, and complementarily change transparency of the first image and that of the second image to reflect the bending information obtained by the sensing unit.

7 Claims, 39 Drawing Sheets

(56) References Cited

U.S. PATENT DOCUMENTS

| | | | |
|---|---|---|---|
| 2003/0227441 A1* | 12/2003 | Hioki | G06F 3/0412 345/156 |
| 2004/0008191 A1* | 1/2004 | Poupyrev et al. | 345/184 |
| 2006/0034042 A1* | 2/2006 | Hisano | G06F 1/1616 361/679.04 |
| 2006/0125799 A1* | 6/2006 | Hillis | G06F 3/011 345/173 |
| 2006/0274036 A1* | 12/2006 | Hioki | G06F 3/0412 345/156 |
| 2007/0247422 A1* | 10/2007 | Vertegaal | G06F 3/017 345/156 |
| 2008/0180399 A1* | 7/2008 | Cheng | G06F 3/041 345/173 |
| 2008/0303782 A1 | 12/2008 | Grant et al. | |
| 2009/0219247 A1 | 9/2009 | Watanabe et al. | |
| 2009/0316062 A1* | 12/2009 | Nishizawa | G02F 1/133305 349/58 |
| 2010/0002402 A1* | 1/2010 | Rogers | H01L 21/4867 361/749 |
| 2010/0011291 A1 | 1/2010 | Nurmi | |
| 2010/0045705 A1* | 2/2010 | Vertegaal | A47G 19/2227 345/661 |
| 2010/0051680 A1* | 3/2010 | Cohen | G06F 1/1641 235/375 |
| 2010/0053072 A1* | 3/2010 | Cohen | G06F 1/1652 345/156 |
| 2010/0053207 A1* | 3/2010 | Cohen | G06F 1/1643 345/619 |
| 2010/0056214 A1* | 3/2010 | Cohen | G06F 1/1615 455/556.2 |
| 2010/0060548 A1* | 3/2010 | Choi | G06F 3/0414 345/1.3 |
| 2010/0103123 A1* | 4/2010 | Cohen | G06F 1/1601 345/173 |
| 2010/0117975 A1 | 5/2010 | Cho | |
| 2010/0120470 A1* | 5/2010 | Kim | G06F 1/1615 455/566 |
| 2010/0141605 A1 | 6/2010 | Kang et al. | |
| 2010/0225578 A1* | 9/2010 | Ko | G06F 3/041 345/156 |
| 2010/0270917 A1* | 10/2010 | Chuang | G02F 1/133305 313/505 |
| 2010/0293489 A1* | 11/2010 | Kim | H04N 1/00241 715/768 |
| 2011/0050588 A1* | 3/2011 | Li et al. | 345/173 |
| 2011/0057873 A1 | 3/2011 | Geissler et al. | |
| 2011/0095974 A1* | 4/2011 | Moriwaki | G09G 3/007 345/156 |
| 2011/0095975 A1* | 4/2011 | Hwang | G06F 1/1626 345/156 |
| 2011/0134087 A1* | 6/2011 | Moriwaki | G09G 3/20 345/204 |
| 2011/0134145 A1* | 6/2011 | Moriwaki | G09G 3/3208 345/660 |
| 2011/0227822 A1* | 9/2011 | Shai | G06F 1/1615 345/156 |
| 2011/0310123 A1* | 12/2011 | Matsubara | 345/634 |
| 2012/0050262 A1* | 3/2012 | Kim | G06F 3/04815 345/419 |
| 2012/0105424 A1* | 5/2012 | Lee | G09F 9/35 345/212 |
| 2012/0112994 A1 | 5/2012 | Vertegaal et al. | |
| 2012/0133621 A1* | 5/2012 | Kim | H04M 1/0206 345/204 |
| 2012/0165069 A1* | 6/2012 | Jung | G01C 21/3664 455/556.1 |
| 2012/0169609 A1 | 7/2012 | Britton | |
| 2012/0200475 A1* | 8/2012 | Baker | G09F 13/04 345/4 |
| 2012/0256720 A1* | 10/2012 | Byun | H01C 10/10 338/2 |
| 2012/0262462 A1* | 10/2012 | Montan | G06F 3/0488 345/473 |
| 2012/0320085 A1* | 12/2012 | Mei | G06F 3/016 345/629 |
| 2013/0002572 A1* | 1/2013 | Jin | G02F 1/133305 345/173 |
| 2013/0044240 A1 | 2/2013 | Leskela et al. | |
| 2013/0127748 A1* | 5/2013 | Vertegaal | A47G 19/2227 345/173 |
| 2013/0201093 A1* | 8/2013 | Kim | G06F 3/033 345/156 |
| 2013/0201115 A1* | 8/2013 | Heubel | 345/173 |
| 2014/0002402 A1 | 1/2014 | Kang et al. | |
| 2014/0068473 A1 | 3/2014 | Jano et al. | |

* cited by examiner

FIG. 4
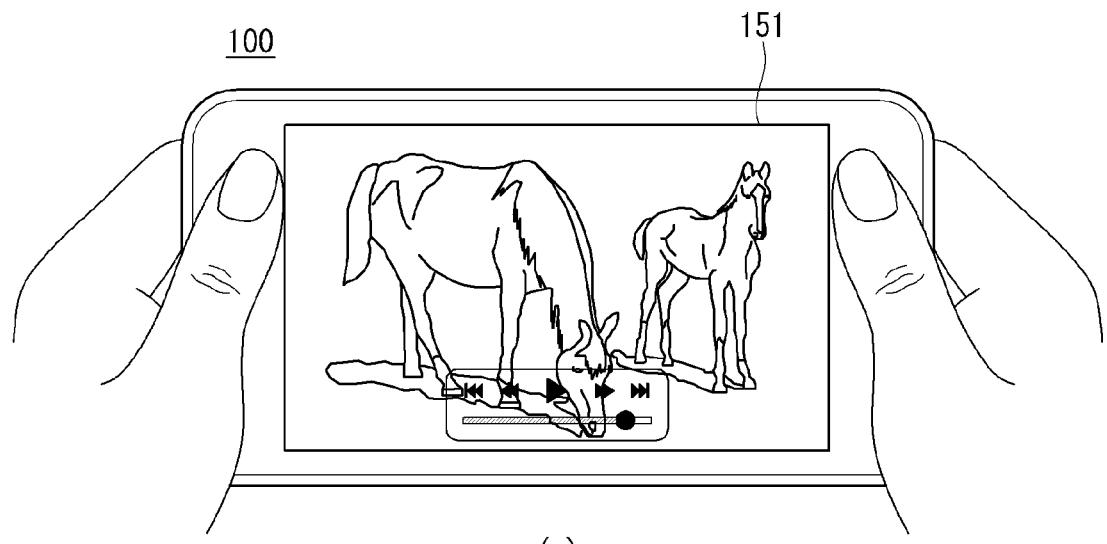
(a)
100% transparency of executed screen image of Web browsing application
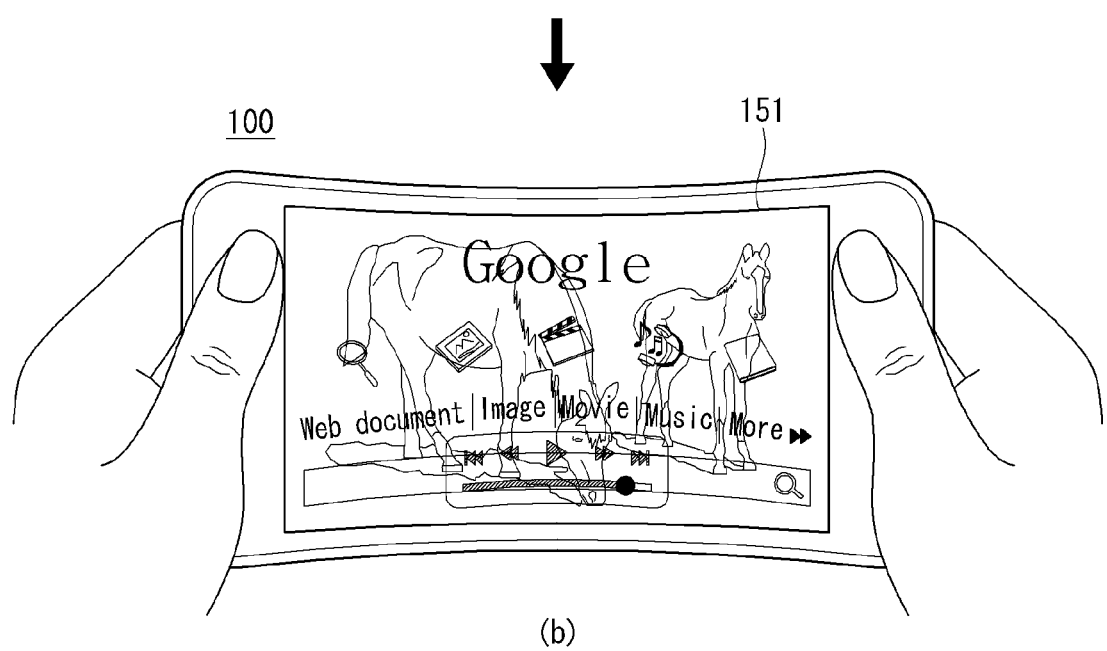
(b)
60% transparency of executed screen image of Web browsing application

FIG. 5
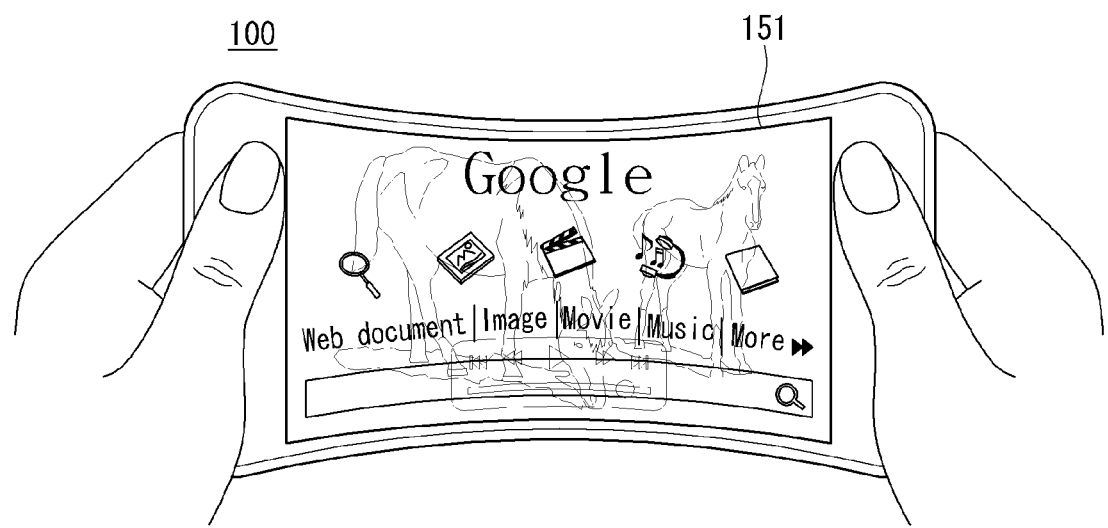
(a)
30% transparency of executed screen image of Web browsing application
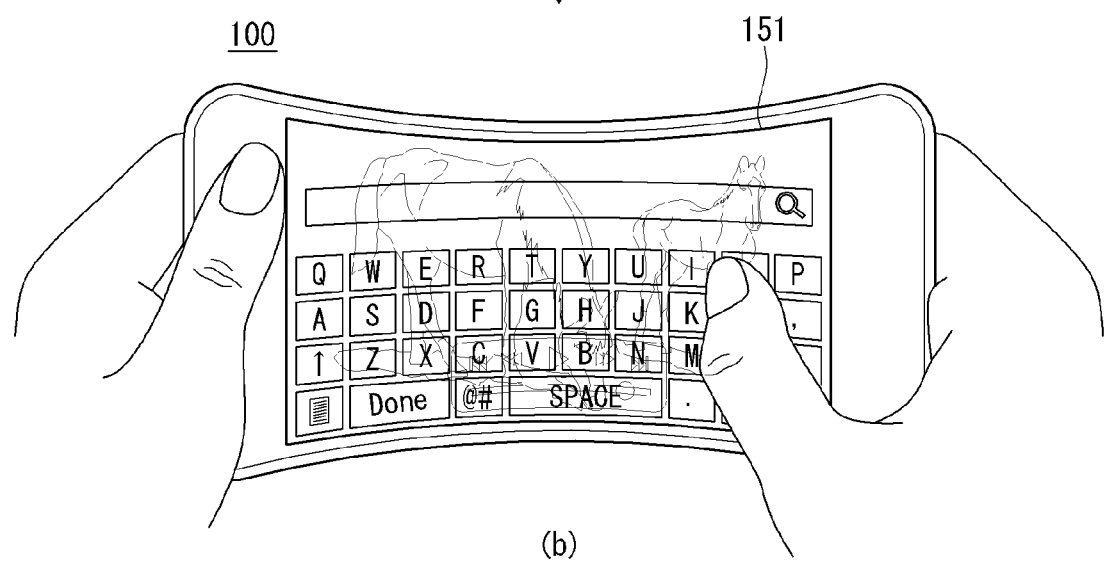
(b)
70% transparency of executed screen image of Web browsing application

FIG. 7
(a)
0% transparency of executed screen image of game application
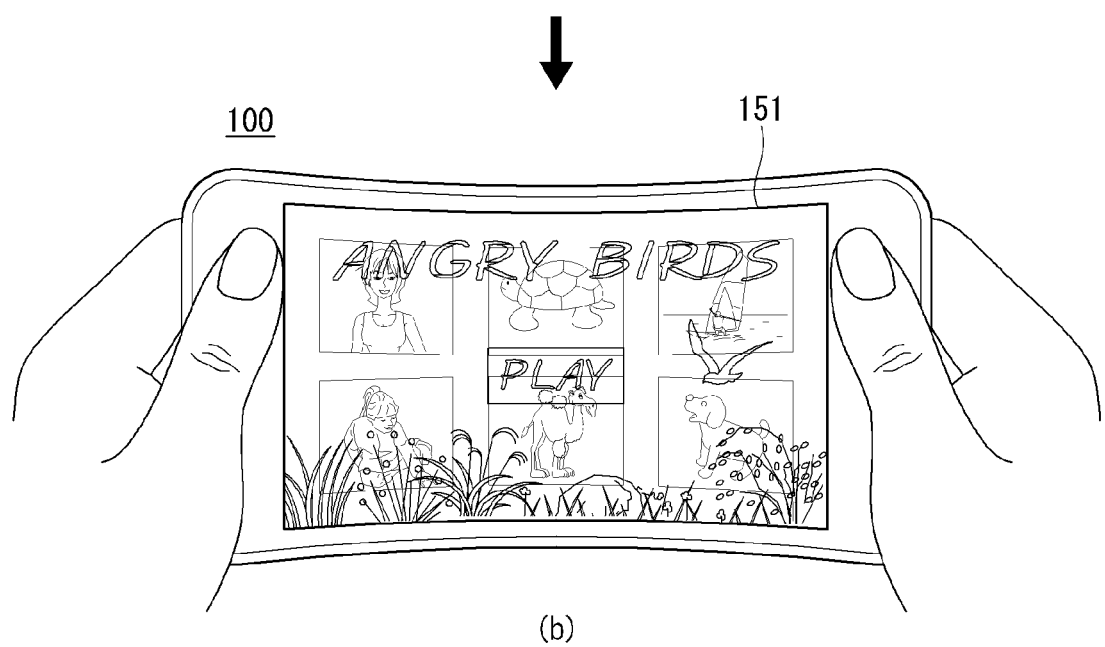
(b)
50% transparency of executed screen image of game application

FIG. 8
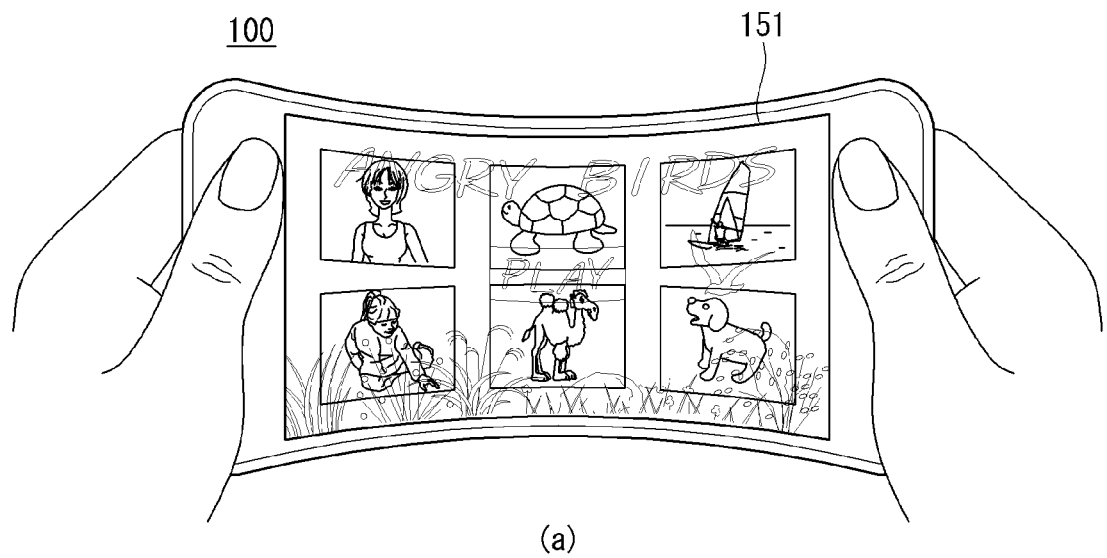
(a)
70% transparency of executed screen image of game application
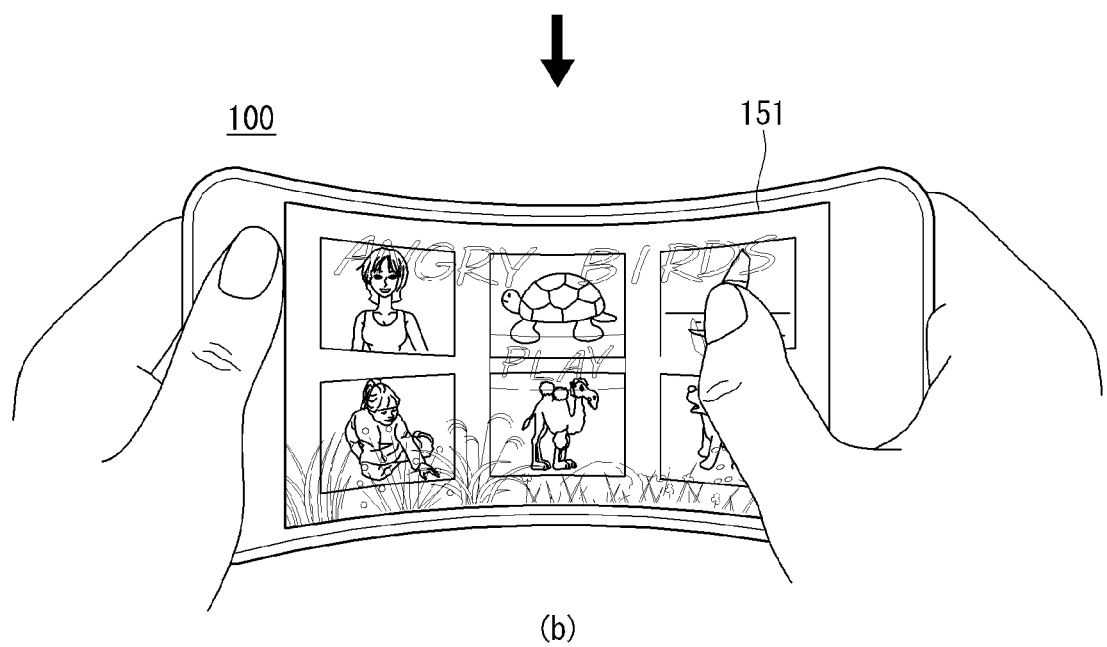
(b)
70% transparency of executed screen image of game application

FIG. 9
(a)
0% transparency of executed screen image of game application
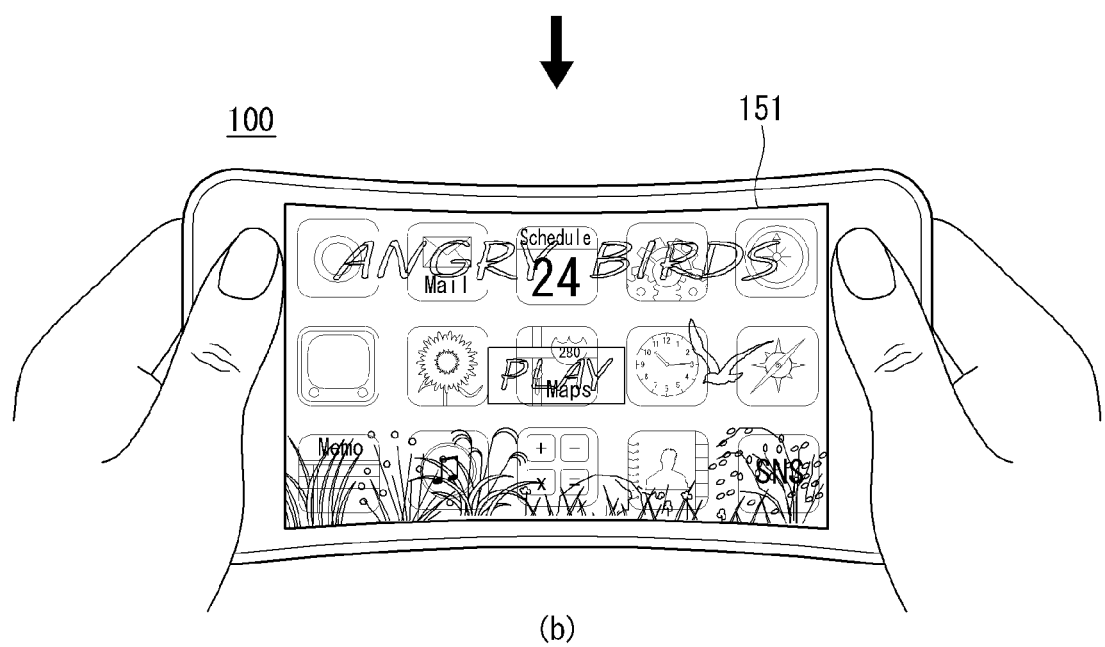
(b)
50% transparency of executed screen image of game application

FIG. 10
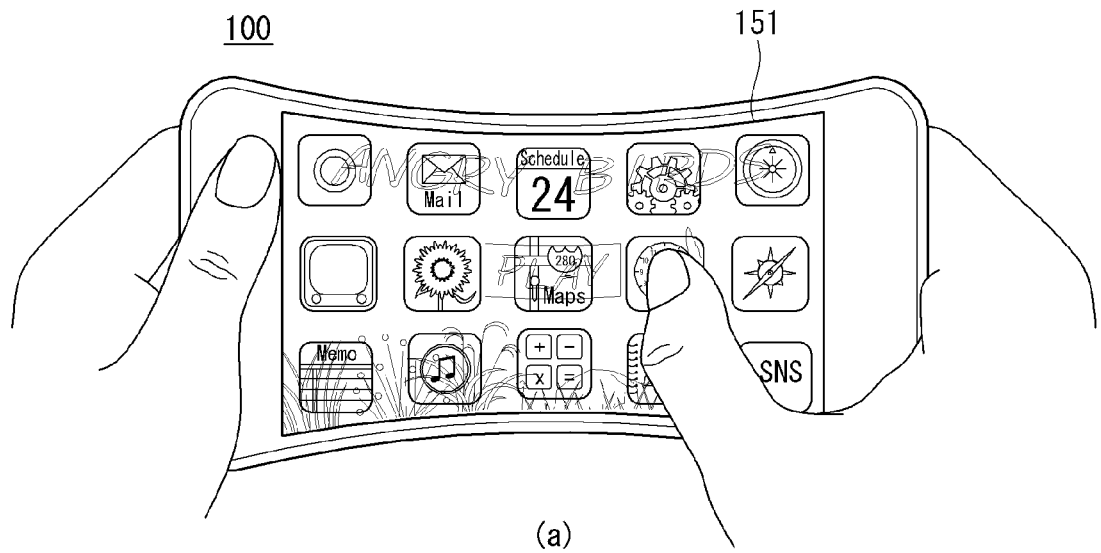
(a)
70% transparency of executed screen image of game application
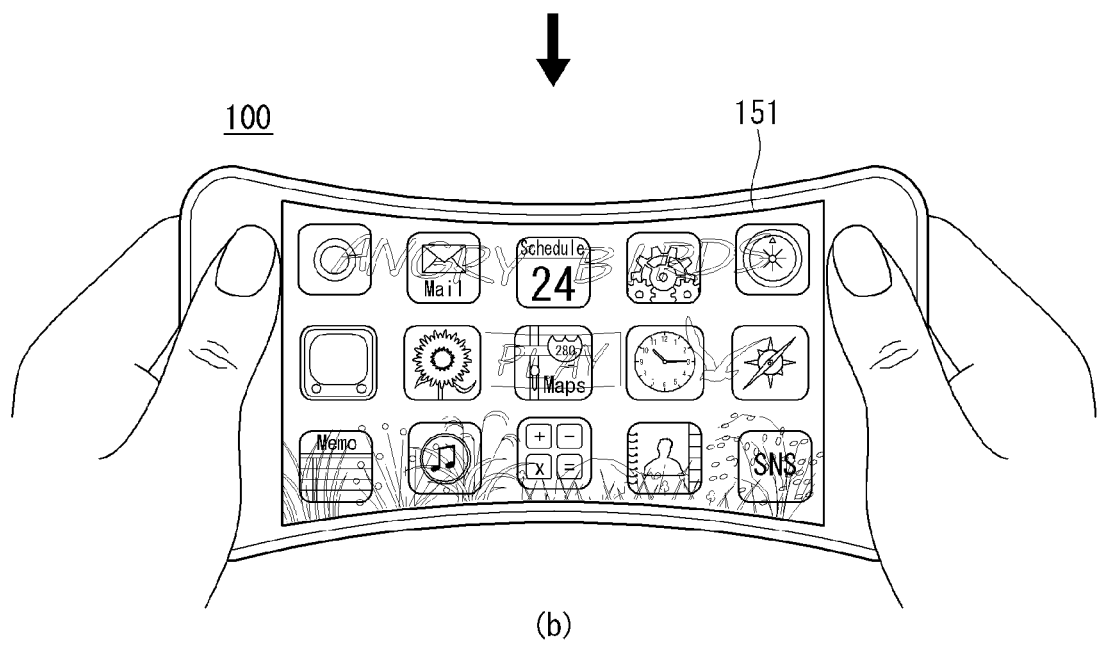
(b)
70% transparency of executed screen image of game application

FIG. 14
(a)
0% transparency of executed screen image of game application
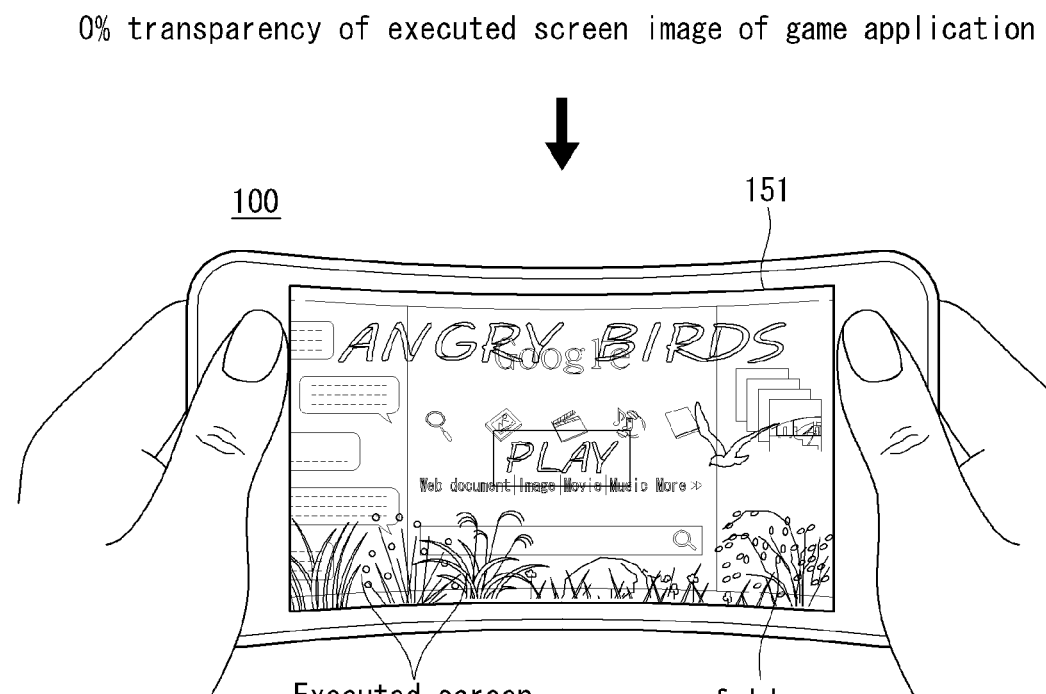
(b)
50% transparency of executed screen image of game application

FIG. 15
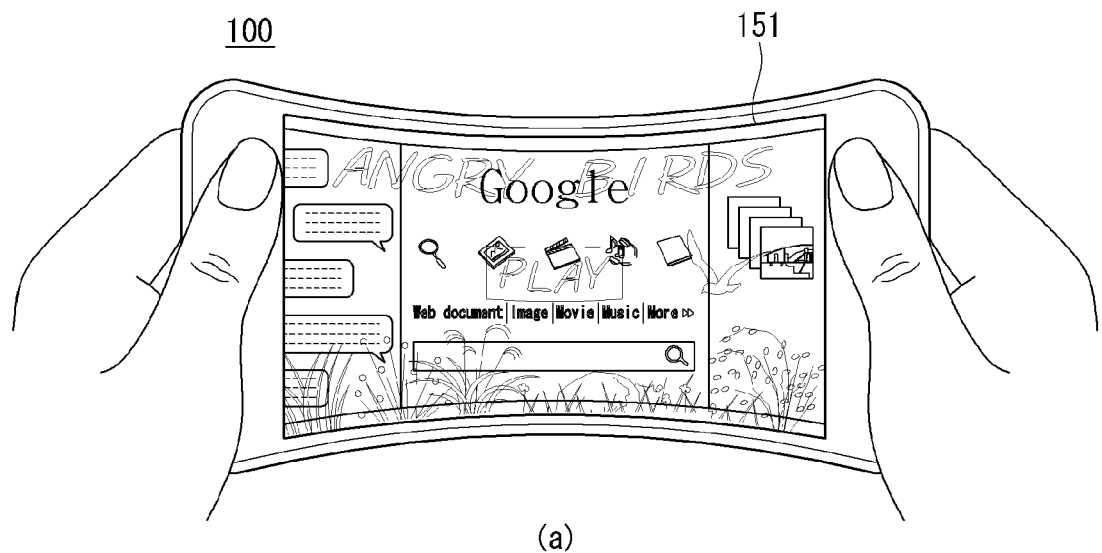
(a)
70% transparency of executed screen image of game application
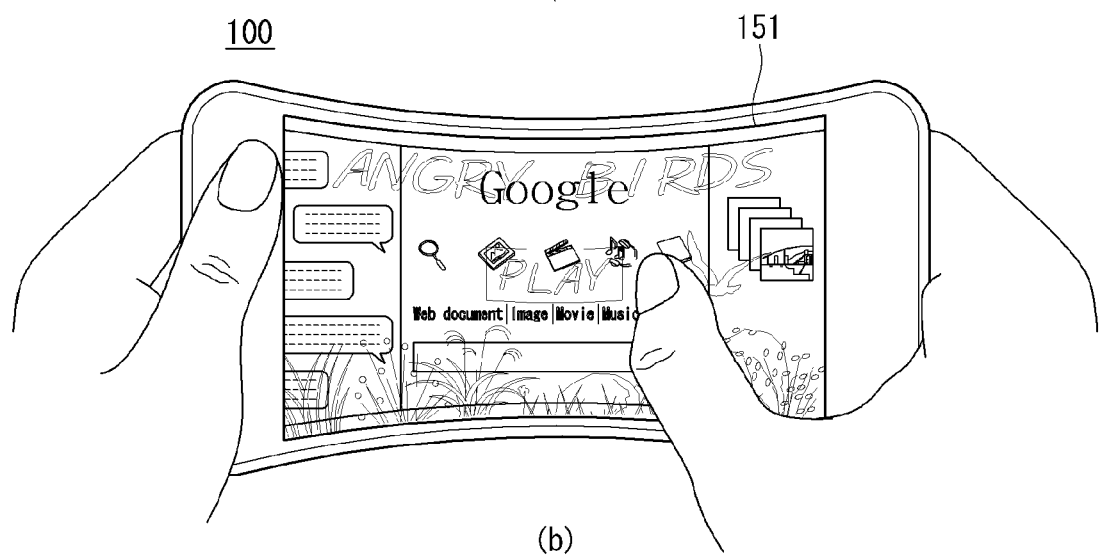
(b)
70% transparency of executed screen image of game application

FIG. 17

| | (a) | (b) | (c) | (d) | (e) | (f) | |
|---|---|---|---|---|---|---|---|
| bending state of display | ▭ | ◡ | ▭ | ◡ | ▭ | ◡ | ... |
| transparency of first image | 0% | 20% | 20% | 40% | 40% | 60% | ... |
| transparency of second image | 100% | 80% | 80% | 60% | 60% | 40% | ... |

FIG. 19

| | (a) | (b) | (c) | (d) | (e) | (f) | |
|---|---|---|---|---|---|---|---|
| bending state of display | ▭ | ∪ | ∪ | ∪ | ∪ | ∪ | ... |
| bending maintaining duration | | ~3sec | 3~6sec | 6~9sec | 9~12sec | 12~15sec | ... |
| transparency of first image | 0% | 10% | 20% | 30% | 40% | 50% | ... |
| transparency of second image | 100% | 90% | 80% | 70% | 60% | 50% | ... |

FIG. 23

| | (a) | (b) | (c) |
|---|---|---|---|
| bending state of display | ▭ | ◡ | ∪ |
| display menu | basic menu | first menu | second menu |

FIG. 24

| bending state of display | (a) | (b) | (c) | (d) |
|---|---|---|---|---|
| | ▭ | ◡ | ▭ | ◡ |
| display menu | basic menu | first menu | basic menu | second menu |

FIG. 25

|  | (a) | (b) | (c) | (d) |
|---|---|---|---|---|
| bending state of display | ▭ | ⌣ | ⌣ | ⌣ |
| bending maintaining duration |  | ~3sec | 3~6sec | 6~9sec |
| display menu | basic menu | first menu | second menu | third menu |

FIG. 26

|  | (a) | (b) | (c) | (d) |
|---|---|---|---|---|
| bending position of display |  | P1 | P2 | P3 |
| display menu | basic menu | first menu | second menu | third menu |

FIG. 27

| bending state of display | (a) | (b) | (c) |
|---|---|---|---|
| | ▭ | ⌒ | ⌣ |
| display menu | basic menu | first menu | second menu |

FIG. 29

| (a) | bending state of display | ▭ | ◡ | ▭ |
|---|---|---|---|---|
| | display menu | basic menu | first menu | basic menu |
| (a) | bending state of display | ▭ | ◡ | ▭ |
| | display menu | basic menu | first menu | first menu |

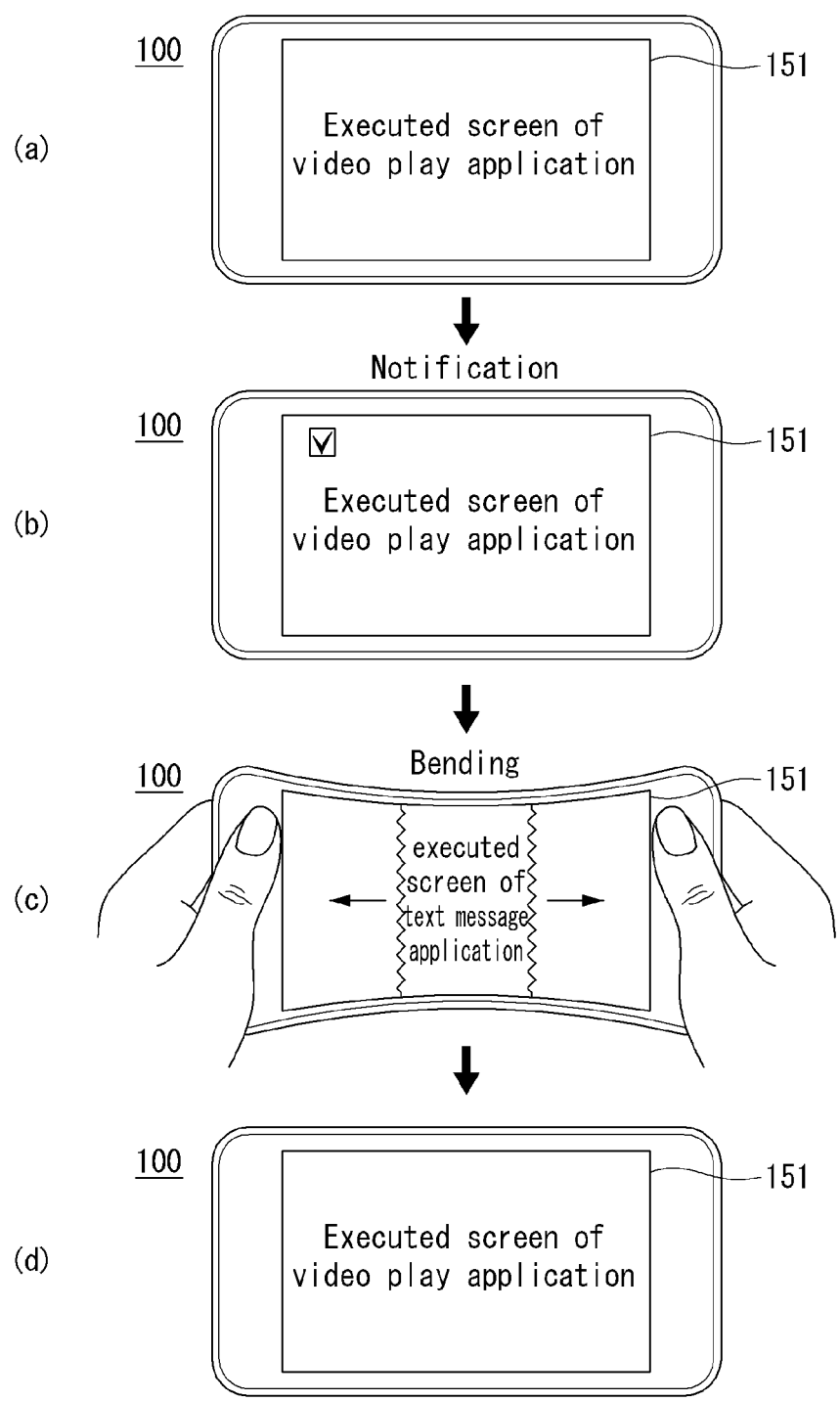

ELECTRONIC DEVICE INCLUDING FLEXIBLE DISPLAY

BACKGROUND

Field of

The present invention relates to an electronic device and, more particularly, to an electronic device capable of performing various user interfacing, functions by using bending characteristics of a flexible display.

Related Art

As functions of electronic devices, in particular, terminals such as a personal computer, a notebook computer, a mobile phone, a smart phone, and the like, are becoming more diversified, terminals are embodied in the form of a multimedia player supporting more complicated functions such as capturing images or video, reproducing music or video files, playing games, receiving broadcast signals, and the like.

Various attempts are applied to mobile terminals implemented in the form of multimedia players in terms of hardware and software in order to implement complicated functions: For example, a user interface environment allowing users to easily and conveniently search or select functions, or the like. Also, as mobile terminals are admitted as users' personal belongings expressing users' personality, designs in various forms, such as a reversible liquid crystal display (LCD) viewed from both sides, a front touch screen, and the like, are required to be changed.

However, since mobility or portability of mobile terminals must be considered, there is a restriction in allocating space for a user interface such as a display, a keypad, or the like. Thus, in order to effectively use various functions supported by mobile terminals, there is a necessity of controlling operations of mobile terminals through a novel input/output scheme, instead of a scheme of sequentially selecting menus of complicated structures.

SUMMARY

Therefore, an aspect of the present invention provides an electronic device providing a user interfacing function for executing various functions by using bending information of a flexible display including a bending degree, a bending position, a bending maintaining duration, and the like.

Technical subjects of the present invention are not limited to the foregoing technical subjects and any other technical subjects not mentioned will be clearly understood by a skilled person in the art from the following description.

According to an aspect of the present invention, an electronic device may include a flexible display, a sensing unit, and a controller. The sensing unit may obtain bending information including at least one of a bending degree, the number of times of bending, a bending maintaining duration, and a bending speed of the display. When the display is bent in a state in which a first image is displayed, the controller may further display a second image on the display and complementarily change transparency of the first image and that of the second image to reflect the bending information obtained by the sensing unit.

According to another aspect of the present invention, an electronic device may include a flexible display, a sensing unit, and a controller. The sensing unit may obtain bending information including at least one of a bending degree, the number of times of bending, a bending maintaining duration, and a bending speed of the display. When the display is bent in a state in which an executed screen image of a particular application is displayed, the controller may additionally display a menu corresponding to the bending information obtained by the sensing unit and may change a menu displayed on the display to reflect the bending information obtained by the sensing unit.

According to another aspect of the present invention, an electronic device may include a flexible display, a sensing unit, and a controller. The sensing unit may obtain bending information including at least one of a bending degree, the number of times of bending, a bending maintaining duration, and a bending speed of the display. When the display is bent in a state in which a particular image is displayed, the controller may additionally display information related to the particular image on the display, and may change the information related to the particular image displayed on the display or change transparency of at least one of the particular image and the information related to the particular image to reflect the bending information obtained by the sensing unit.

According to another aspect of the present invention, an electronic device may include a flexible display, a sensing unit, and a controller. The sensing unit may obtain bending information including at least one of a bending degree, the number of times of bending, a bending maintaining duration, and a bending speed of the display. When the display is bent in a state in which a particular image is displayed, the controller may display information related to the particular image corresponding to the bending information obtained by the sensing unit on the display, and may display it to reflect the bending information obtained by the sensing unit.

According to embodiments of the present invention, an electronic device can provide a user interfacing function for executing various functions by using bending information of a flexible display including a bending degree, a bending position, a bending maintaining duration, and the like.

BRIEF DESCRIPTION OF THE DRAWINGS

The above and other objects and features of the present invention will become apparent from the following description of preferred embodiments given in conjunction with the accompanying drawings, in which:

FIGS. 4 and 5 are views showing an example of changing screen images according to the method for driving a mobile terminal illustrated in FIG. 3.

FIGS. 7 and 8 are views showing an example of changing screen images according to the method for driving a mobile terminal illustrated in FIG. 6.

FIGS. 9 and 10 are views showing another example of changing screen images according to the method for driving a mobile terminal illustrated in FIG. 6.

FIGS. 14 and 15 are views showing an example of changing screen images according to the method for driving a mobile terminal illustrated in FIG. 13.

FIG. 17 is a view showing an example of changing transparency of images displayed on a display based on the number of times of bending of the display according to the method for driving a mobile terminal illustrated in FIG. 16.

FIG. 19 is a view showing an example of changing transparency of images displayed on a display based on a bending maintaining duration of the display according to the method for driving a mobile terminal illustrated in FIG. 18.

FIG. 23 is a view showing an example of changing menus displayed on the display according to a bending degree of the display.

FIG. 24 is a view showing an example of changing menus displayed on the display according to the number of times of bending of the display.

FIG. 25 is a view showing an example of changing menus displayed on the display according to a bending maintaining duration of the display.

FIG. 26 is a view showing an example of changing menus displayed on the display according to a bending position of the display.

FIG. 27 is a view showing an example of changing menus displayed on the display according to a bending direction of the display.

FIG. 29 is a view showing an example of determining whether to maintain a display state of a menu displayed on the display according to a bending degree of the display, when the bending of the display is released according to the method for driving an electronic device illustrated in FIG. 28.

FIG. 39 is a view showing another example of displaying an additional image on the display based on bending of the display, according to the method for driving an electronic device according to an embodiment of the present invention.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

An electronic device according to an embodiment of the present invention may provide a user interfacing function capable of executing various functions by using bending characteristics (or bendability) of a flexible display. Hereinafter, the user interfacing function provided b using the bending characteristics of the display in the electronic device will be described. However, coverage of the user interfacing function using bending characteristics of the display is not limited to mobile terminals.

The mobile terminal described in the specification may include a cellular phone, a smart phone, a laptop computer, a digital broadcasting terminal, personal digital assistants (PDA), a portable multimedia player (PMP), a navigation system and so on.

An overall configuration of the mobile terminal according to an embodiment of the present invention will be described.

Figure 1:
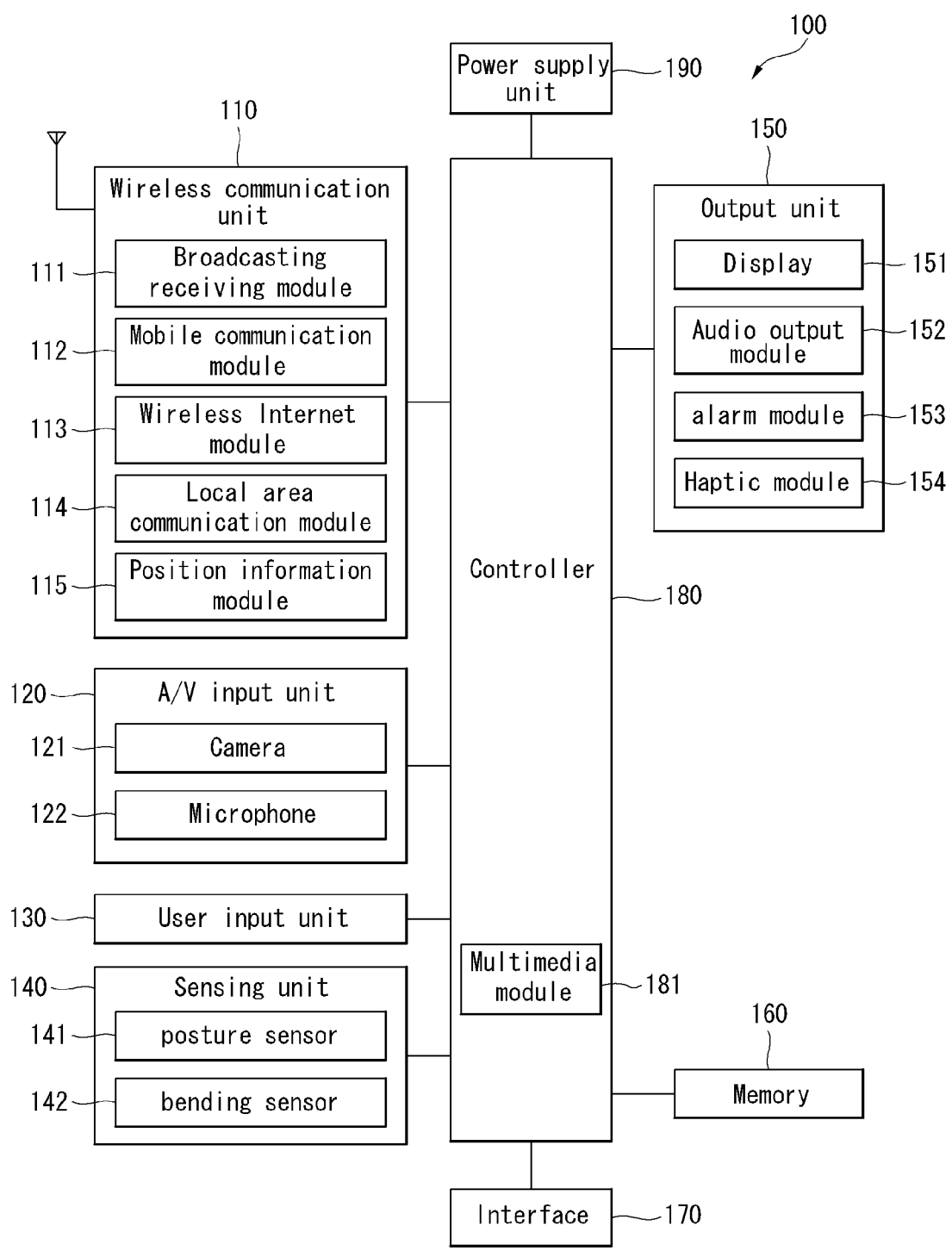
FIG. 1 is a block diagram of a mobile terminal according to an embodiment of the present invention.

FIG. 1 is a block diagram of an implementation of a mobile terminal 100. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

As shown in FIG. 1, the sensing unit 140 may include a posture sensor 141 for sensing a posture of the mobile terminal 100 and a bending sensor 142. The bending sensor 142 may obtain bending information including a bending degree, the number of times of bending, a bending maintaining duration, a bending speed, a bending direction, and the like. However, the types of bending information that can be obtained by the bending sensor 142 are not limited to the foregoing examples.

The output unit 150 generates visual, auditory or tactile output and can include the display 151, an audio output module 152, an alarm module 153 and a haptic module 154.

The display 151 displays information processed by the mobile terminal 100. For example, the display 151 displays UI or graphic user interface (GUI) related to a telephone call when the mobile terminal is in the call mode. The display 151 displays a captured or/and received image, UI or GUI when the mobile terminal 100 is in the video telephony mode or the photographing mode.

The display 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display 151 can also be of the light transmission type. According to this structure, a user can see an object located behind the body of the mobile terminal 100 through an area of the body of the mobile terminal 100, which is occupied by the display 151.

The mobile terminal 100 can include at least two displays 151 according to constitution of the terminal. For example, the mobile terminal 100 can include a plurality of displays that are arranged on a single face at a predetermined distance or integrated. Otherwise, the plurality of displays can be arranged on different sides.

In the case where the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

The touch sensor can be constructed such that it converts a variation in pressure applied to a specific portion of the display 151 or a variation in capacitance generated at a specific portion of the display 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The display 151 may be a flexible display that can be bent by force applied from the outside. For example, the shape of the display 151 may be changeable by force applied from the outside, and the changed shape of the display 151 may be maintained as it is unless force opposite to the force which has been applied from the outside is applied thereto. If force opposite to the force which has been applied from the outside is applied to the display 151, the shape of the display 151 may be restored to its original shape.

In contrast, the display 151 may have restoration elastic force. For example, the shape of the display 151 may be changeable by force applied from the outside, but when the force applied from the outside disappears, the display 151 may be restored to its original shape.

Meanwhile, the bending sensor 142 of the sensing unit 140 may obtain bending information including at least one of a bending degree, a bending position, a bending direction, the number of times of bending, a bending maintaining duration, and a bending speed of the display 151. However, the bending information obtained from the electronic device 100 according to an embodiment of the present invention and used for user interfacing is not limited to the foregoing examples.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

The construction of the mobile terminal 100 according to the present invention has been described above with reference to FIG. 1. Hereinafter, examples of performing user interfacing operation based on bending with respect to the display 151 in the mobile terminal 100 according to an embodiment of the present invention will be described with reference to FIGS. 2 through 37.

Figure 2:
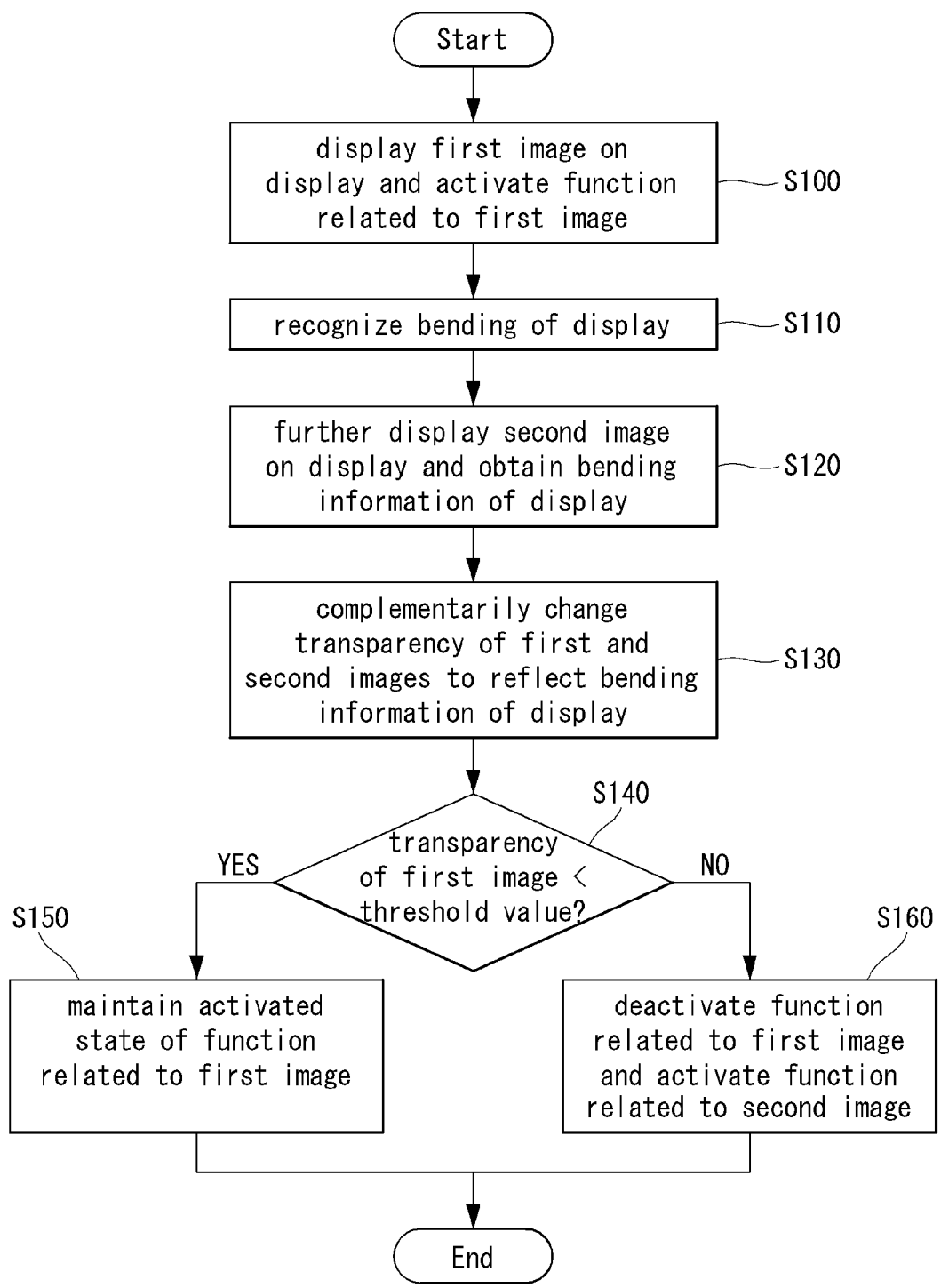
FIG. 2 is a flow chart illustrating a method for driving a mobile terminal according to an embodiment of the present invention.

FIG. 2 is a flow chart illustrating a method for driving the mobile terminal 100 according to an embodiment of the present invention. The method for driving the mobile terminal 100 will be described with reference to the relevant drawings.

The controller 180 displays a first image on the display 151 and activates a function related to the first image (S100). Here, the first image may be an executed screen image of a first application and the display 151 may be implemented as a touch screen. Namely, the first image may be an executed screen image of the first application displayed on the display 151 by a user's touch applied to an icon of the first application, and the user may execute various functions of the first application through a touch with respect to the executed screen image of the first application.

With the first image displayed, bending of the display 151 is recognized (S110). Then, the controller 180 further displays a second image on the display 151 and obtains bending information of the display 151 (S120).

Here, at least a portion of a display region of the second image may overlap with that of the first image, and transparency of the first image may be different from that of the second image. For example, when the second image is displayed on the display 151, the controller 180 may display the first image such that it is clearer than the second image.

Also, the second image may be an executed screen image of the second application, and the bending information may include a bending degree, a bending position, a bending direction, the number of times of bending, a bending maintaining duration, a bending speed, and the like. However, the bending information obtained from the electronic device 100 according to an embodiment of the present invention and used for user interfacing is not limited to the foregoing examples.

When the bending information of the display 151 is obtained, the controller 180 may complementarily change the transparency of the first image and that of the second image to reflect the bending information of the display 151 (S130). Namely, when the bending information of the display 151 is changed, the controller 180 may reduce the transparency of the second image while increasing that of the first image, or increase the transparency of the first image while reducing that of the first image.

When the transparency of the first image is lower than a predetermined threshold value according to the results obtained by changing the transparency of the first image and that of the second image (S140), the controller 180 maintains the activation state of the function related to the first image (S150). For example, the controller 180 may maintain the activation state of the first application displayed on the display 151.

However, when the transparency of the first image is equal to or higher than a predetermined threshold value according to the results obtained by changing the transparency of the first image and that of the second image (S140), the controller 180 deactivates the function related to the first image and activates a function related to the second image (S160).

For example, according to bending of the display 151, the controller 180 deactivates the first application which has been displayed on the display 151, and activates the second application displayed on the display 151. Then, the user may execute various functions of the second application through a touch with respect to the display 151 implemented as a touch screen.

As described above, the electronic device 100 according to an embodiment of the present invention can provide the user interfacing function of selectively activating the function related to the first image and the function related to the second image based on the transparency of the first image, while complementarily changing the transparency of the first image and that of the second image displayed on the display 151 by using the bending information of the display 151.

Figure 3:
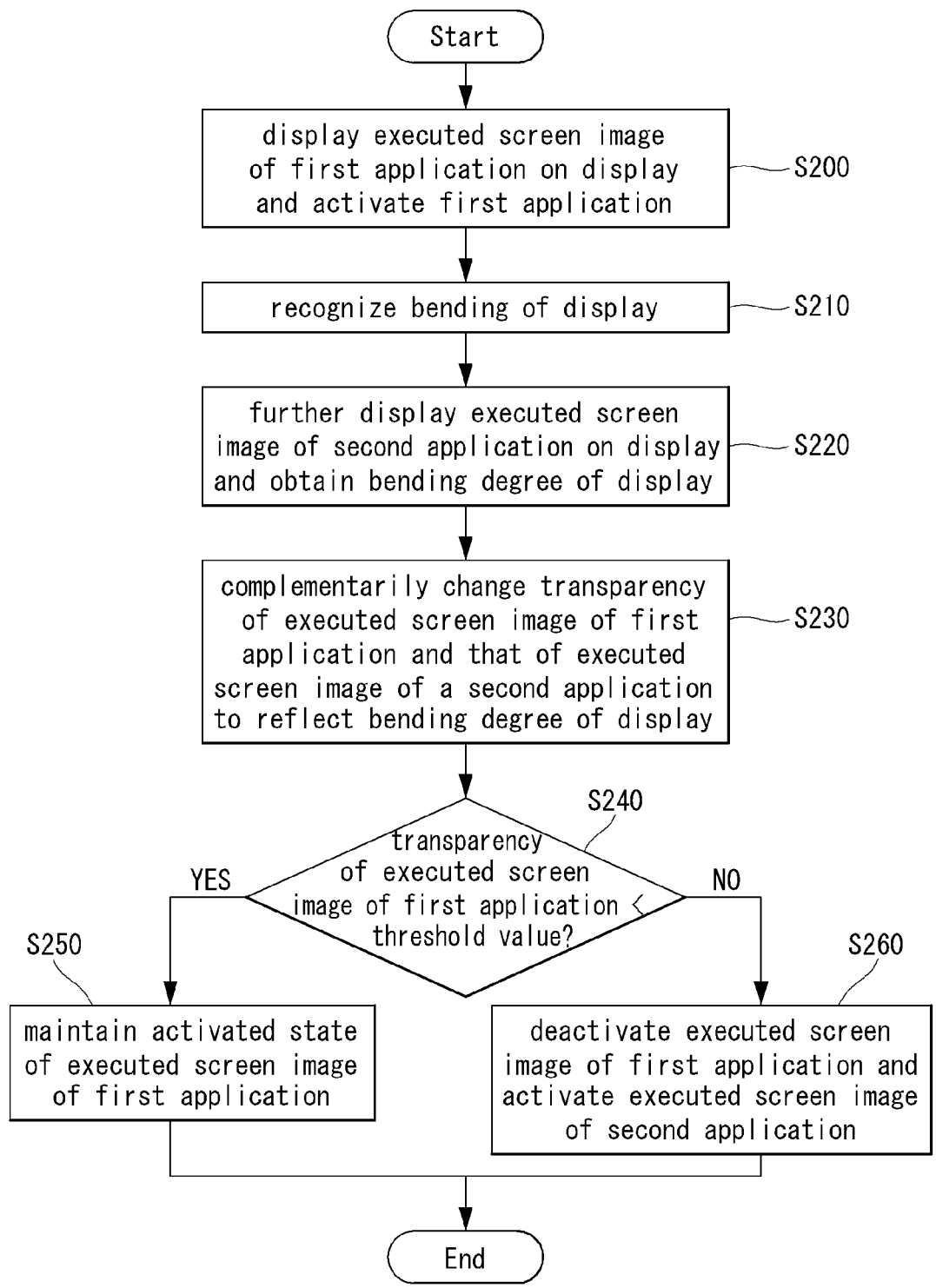
FIG. 3 is a flow chart illustrating an example of the method for driving a mobile terminal illustrated in FIG. 2.

FIG. 3 is a flow chart illustrating an example of the method for driving the mobile terminal 100 illustrated in FIG. 2. A method for driving the mobile terminal 100 will be described with reference to the relevant drawings.

The controller 180 executes the first application on the display 151 and activates the first application (S200). When the display 151 is implemented as a touch screen, the user may execute various functions of the first application through a touch with respect to the executed screen image of the first application.

With the executed screen image of the first application displayed, bending of the display 151 is recognized (S210). Then, the controller 180 may further display an executed screen image of the second application on the display 151, and obtains a bending degree of the display 151 (S220).

When the bending degree of the display 151 is obtained, the controller 180 may complementarily change the transparency of the executed screen image of the first application and that of the executed screen image of the second application to reflect the bending degree of the display 151 (S230).

When the transparency of the executed screen image of the first application is lower than a predetermined threshold value according to the results obtained by changing the transparency of the executed screen image of the first application and that of the executed screen image of the second application (S240), the controller 180 maintains the activation state of the executed screen image of the first application (S250).

However, when the transparency of the executed screen image of the first execution is equal to or higher than a predetermined threshold value according to the results obtained by changing the transparency of the executed screen image of the first application and that of the executed screen image of the second application (S240), the controller 180 deactivates the executed screen image of the first application and activates the executed screen image of the second application (S260). Then, the user may execute various functions of the second application through a touch with respect to the display 151 implemented as a touch screen.

As described above, the electronic device 100 according to an embodiment of the present invention can provide the user interfacing function of selectively activating the first and second applications based on the transparency of the executed screen image of the first application, while complementarily changing the transparency of the executed screen image of the first application and that of the executed screen image of the second application displayed on the display 151 by using the bending information of the display 151.

FIGS. 4 and 5 are views showing an example of changing screen images according to the method for driving the mobile terminal 100 illustrated in FIG. 3.

FIG. 4(*a*) shows a state in which an executed screen image of a video play application is displayed on the display 151 and the video play application is activated. Namely, the user may execute various functions of the video play application through a touch with respect to the display 151 implemented as a touch screen.

In the state of FIG. 4(*a*), the user applies force to bend the display 151. Then, as shown in FIG. 4(*a*), the display 151 is bent in the opposite direction of the user, and the controller 180 further displays an executed screen image of the Web browsing application on the display 151.

Meanwhile, it can be seen that transparency of the executed screen image of the video play application is increased according to the bending of the display 151 and that of the executed screen image of the Web browsing application is reduced. This is because, in the state of FIG. 4(*a*), transparency of the executed screen image of the Web browsing application is considered to be 100%.

In state of FIG. 4(*b*), the user further applies force to bend the display 151. Then, as shown in FIG. 5(*a*), the display 151 is bent in the opposite direction of the user, and the controller 180 further increases transparency of the executed screen image of the video play application and reduces that of the Web browsing application.

Meanwhile, in FIG. 5(*a*), it is noted that transparency of the video play application is increased to be 70% greater than 50% as a threshold value. Then, the controller 180 deactivates the executed screen image of the video play application and activates the executed screen image of the Web browsing application. Then, as shown in FIG. 5(*b*), the user may input words for Web browsing through a touch with respect to the display 151.

It is assumed that the display 151 illustrated in FIGS. 4 and 5 has restoration elastic force. In the state of FIG. 5(*b*), the user gradually reduces to remove the force applied to the display 151. Then, the bending state of the display 151, transparency of the executed screen image of the video play application, and transparency of the executed screen image of the Web browsing application may be restored from the state of FIG. 5(*b*) to the state of FIG. 4(*a*), in order reverse to that illustrated in FIGS. 4 and 5. This can be applicable to a method for driving the mobile terminal 100 according to an embodiment of the present invention as explained hereafter.

It is assumed that the display 151 illustrated in FIGS. 4 and 5 does not have restoration elastic force. Then, in order to restore the bending state of the display 151, transparency of the executed screen image of the video play application, and transparency of the executed screen image of the Web browsing application from the state of FIG. 5(*b*) to the state of FIG. 4(*a*) in order reverse to that illustrated in FIGS. 4 and 5, the user should apply force in a direction opposite to that of force applied to the display 151 in FIGS. 4 and 5. This can be applicable to a method for driving the mobile terminal 100 according to an embodiment of the present invention as explained hereafter.

Figure 6:
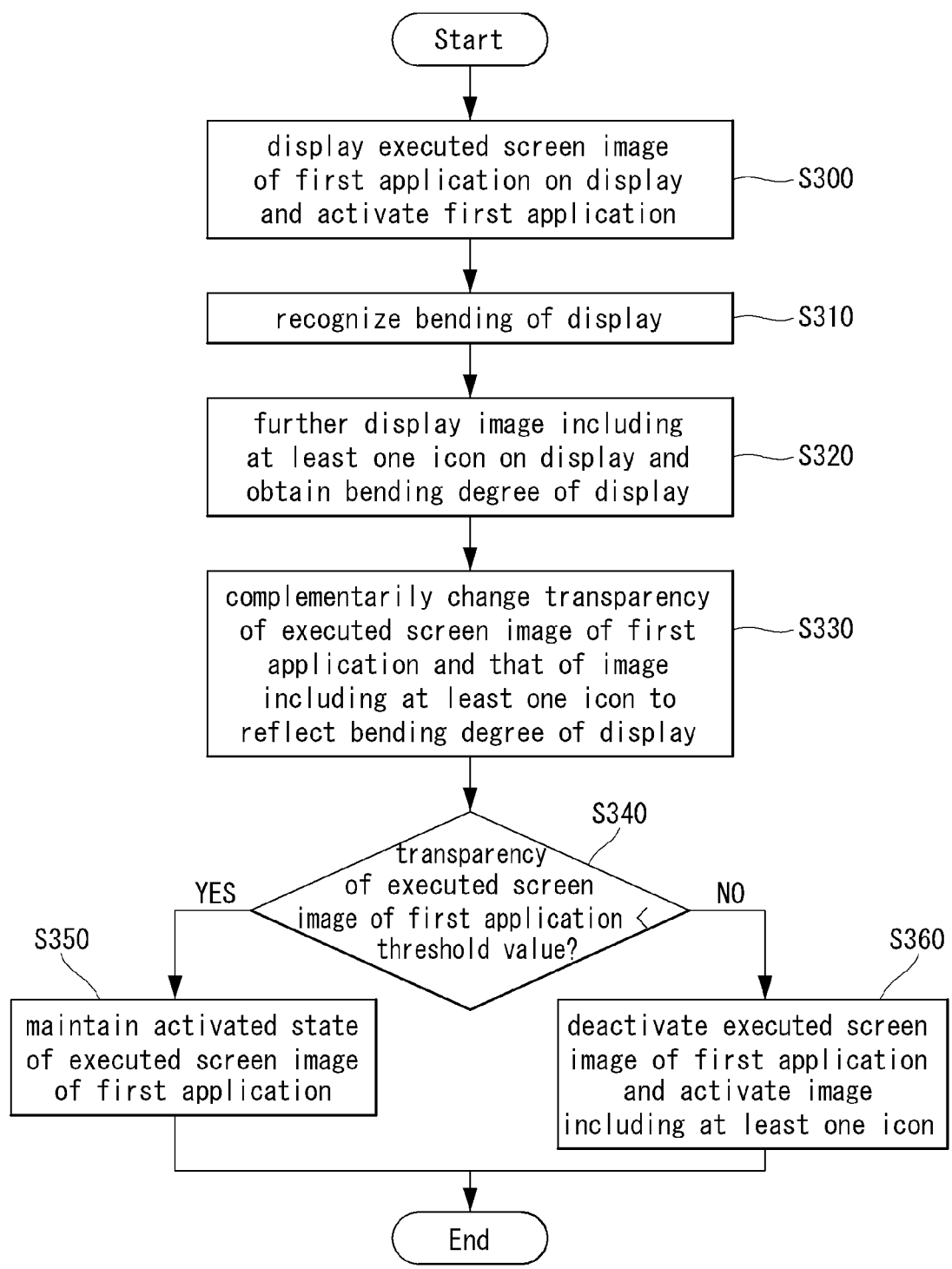
FIG. 6 is a flow chart illustrating an example of the method for driving a mobile terminal illustrated in FIG. 2.

FIG. 6 is a flow chart illustrating an example of the method for driving the mobile terminal 100 illustrated in FIG. 2. A method for driving the mobile terminal 100 will be described with reference to relevant drawings.

The controller 180 executes the first application on the display 151 and activates the first application (S300). When the display 151 is implemented as a touch screen, the user may execute various functions of the first application through a touch with respect to the first application.

With the executed screen image of the first application displayed, bending of the display 151 is recognized (S310). Then, the controller 180 further displays a screen image including at least one icon on the display 151, and obtains a bending degree of the display 151 (S320). Here, each of at least one icon may be an execution icon of a particular application.

When the bending degree of the display 151 is obtained, the controller 180 complementarily changes transparency of the executed screen image of the first application and that of the screen image including at least one icon to reflect the bending degree of the display 151 (S330).

When the transparency of the executed screen image of the first application is lower than a predetermined threshold value according to the results obtained by changing the transparency of the executed screen image of the first application and that of the screen image including at least one icon (S340), the controller 180 maintains the activation state of the executed screen image of the first application (S350).

However, when the transparency of the executed screen image of the first execution is equal to or higher than a predetermined threshold value according to the results obtained by changing the transparency of the executed screen image of the first application and that of the screen image including at least one icon (S340), the controller 180 deactivates the executed screen image of the first application and activates the screen image including at least one icon (S360).

Then, the user may select any one among the at least one icon through a touch with respect to the display 151 implemented as a touch screen, and execute a particular application corresponding to the selected icon.

As described above, the electronic device 100 according to an embodiment of the present invention can provide the user interfacing function of executing another application in a state in which an executed screen image of the first application is displayed based on the transparency of the executed screen image of the first application, while complementarily changing the transparency of the executed screen image of the first application displayed on the display 151 and that of the screen image including at least one icon by using the bending information of the display 151.

FIGS. 7 and 8 are views showing an example of changing screen images according to the method for driving the mobile terminal 100 illustrated in FIG. 6. For reference, FIGS. 7 and 8 show an example of executing an application which was previously executed before a currently executed application by using bending of the display 151.

FIG. 7(*a*) shows a state in which an executed screen image of a game application is displayed and the game application is activated. Namely, the user may execute various functions related to the game application through a touch with respect to the display 151 implemented as a touch screen.

In the state of FIG. 7(*a*), the user applies force to bend the display 151. Then, as shown in FIG. 7(*b*), the display 151 is bent in the opposite direction of the user, and the controller 180 further displays an image including a plurality of execution icons corresponding to the plurality of applications which were executed before the game application on the display 151.

Meanwhile, through the bending of the display 151, transparency of the executed screen image of the game application is increased and that of the image including the plurality of execution icons is reduced. This is because, in the state of FIG. 7(*a*), transparency of the image including the plurality of execution icons is considered to be 100%.

In the state of FIG. 7(*b*), the user further applies force to bend the display 151. Then, as shown in FIG. 8(*a*), the display 151 is further bent in the opposite direction of the user, and the controller 180 further increases transparency of the executed screen image of the game application and reduces that of the image including the plurality of execution icons.

Meanwhile, in FIG. 8(*a*), it is noted that transparency of the game application is increased to be 70% greater than 50% as a threshold value. Then, the controller 180 deactivates the executed screen image of the game application and activates the image including a plurality of execution icons. Then, as shown in FIG. 8(*b*), the user may touch a particular icon among the execution icons of the applications executed before the gate application was executed to execute an application corresponding to the particular icon.

FIGS. 9 and 10 are views showing another example of changing screen images according to the method for driving the mobile terminal 100 illustrated in FIG. 6. For reference, FIGS. 9 and 10 shows an example of executing an application corresponding to an icon displayed on a background screen image while a particular application is being executed by using bending of the display 151.

FIG. 9(*a*) shows a state in which an executed screen image of a game application is displayed on the display 151, and the game application is activated. In the state of FIG. 9(*a*), the user applies force to bend the display 151.

Then, as shown in FIG. 9(*b*), the display 151 is bent in the opposite direction of the user and the controller 180 further displays the background screen image on the display 151. Meanwhile, transparency of the executed screen image of the game application is increased and that of the image including the plurality of execution icons is reduced according to the bending of the display 151. This is because, in the state of FIG. 9(*a*) in which the background screen image is not displayed, transparency of the background screen image is considered to be 100%.

In the state of FIG. 9(*b*), the user further applies force to bend the display 151. Then, as shown in FIG. 10(*a*), the display 151 is further bent in the opposite direction of the user and the controller 180 further increases transparency of the executed screen image of the game application and reduces that of the background screen image.

Meanwhile, in FIG. 10(*a*), it is noted that transparency of the game application is increased to be 70% greater than 50% as a threshold value. Then, the controller 180 deactivates the executed screen image of the game application and activates the background screen image. Then, as shown in FIG. 10(*b*), the user may touch a particular icon among the execution icons of the applications displayed on the background screen image to execute an application corresponding to the particular icon.

Figure 11:
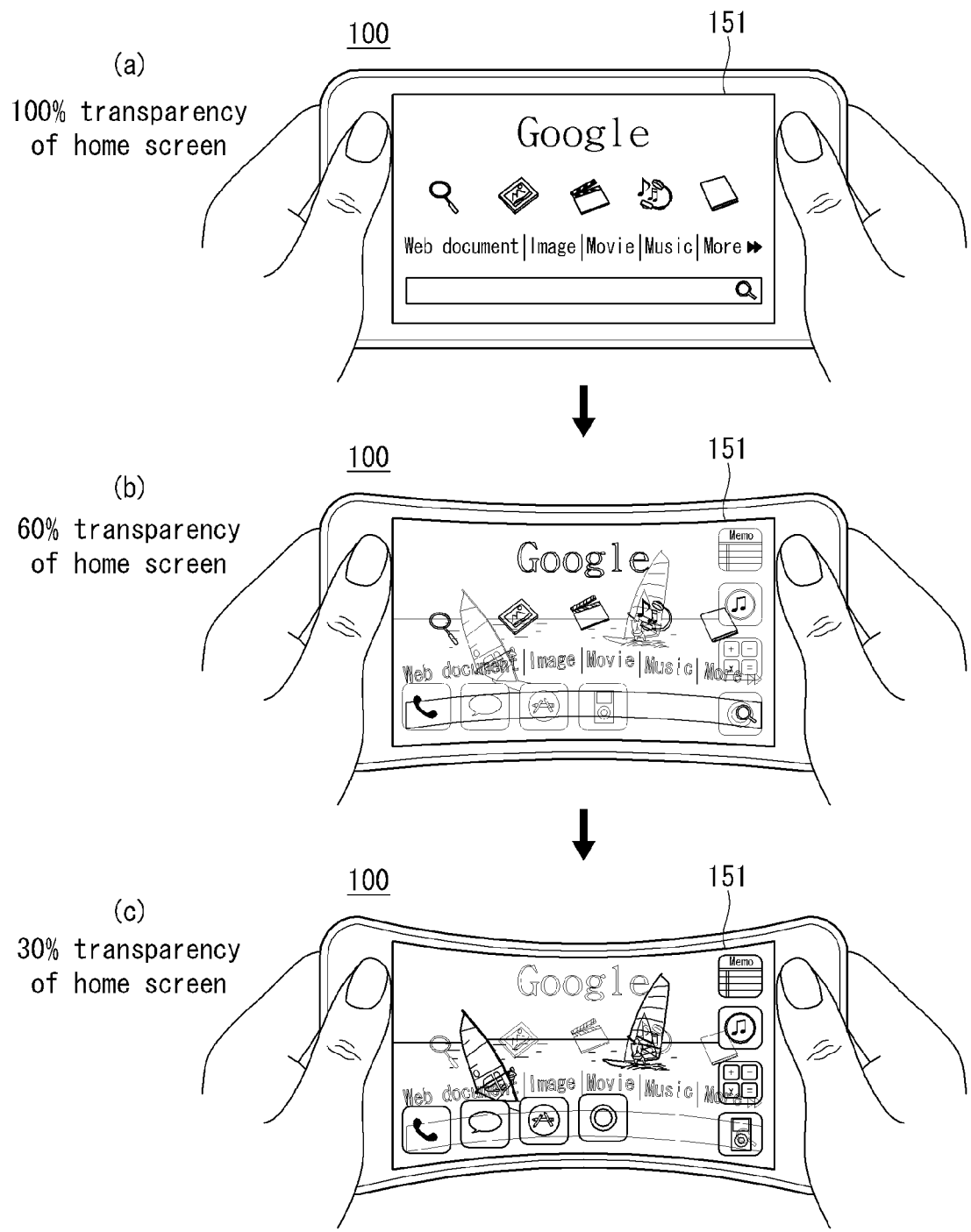
FIGS. 11 and 12 are views showing another example of changing screen images according to the method for driving a mobile terminal illustrated in FIG. 6.
Figure 12:
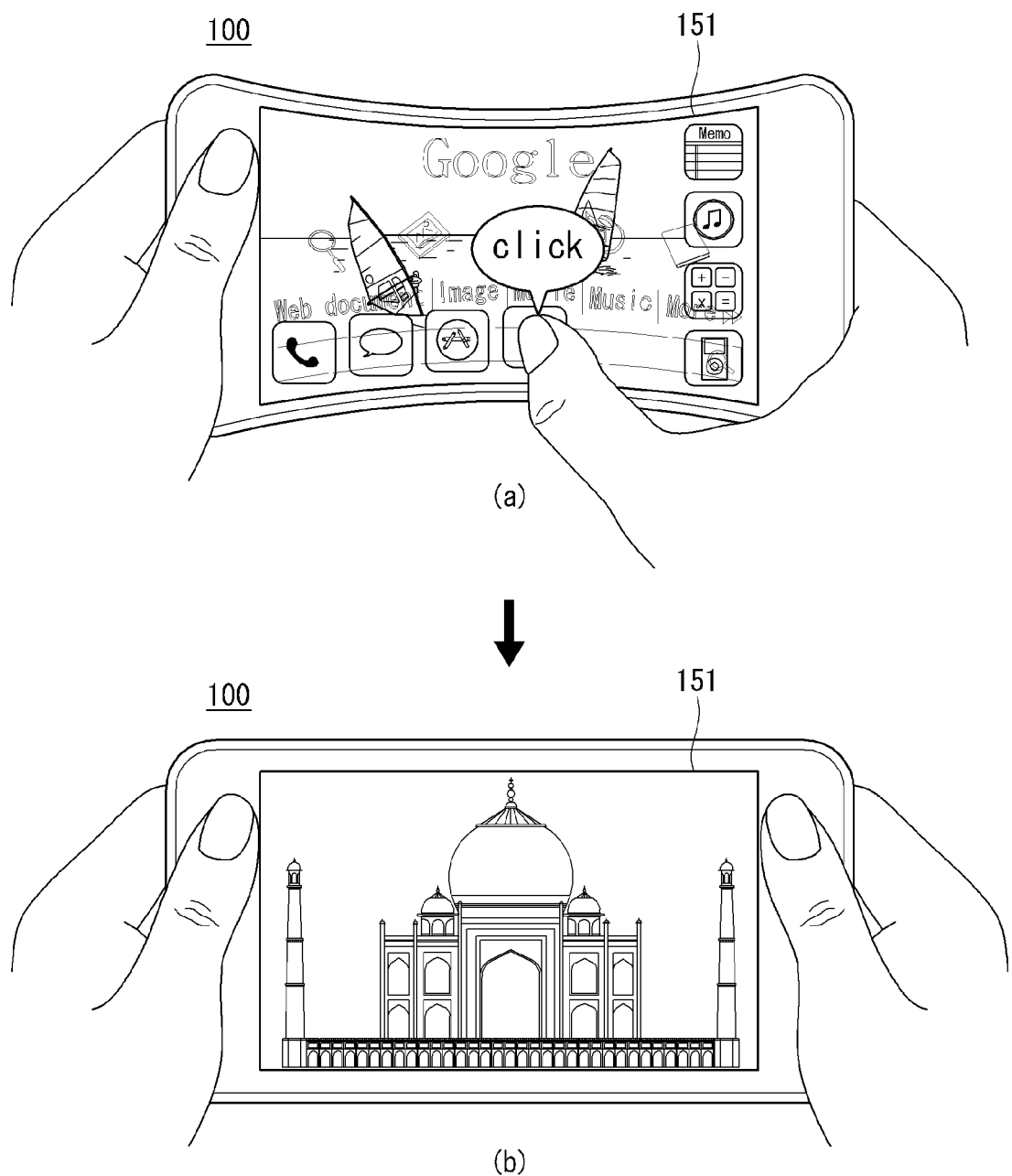

FIGS. 11 and 12 are views showing another example of changing screen images according to the method for driving the mobile terminal 100 illustrated in FIG. 6. For reference, FIGS. 11 and 12 show an example of executing an application corresponding to an icon displayed on a home screen while a particular application is being executed by using bending of the display 151.

FIG. 11(*a*) shows a state in which an executed screen image of a Web browsing application is displayed on the display 151 and the executed screen image of the Web browsing application is activated. Here, in the state of FIG. 11(*a*) in which the home screen image is displayed on the display 151, the user applies force to bend the display 151.

Then, as shown in FIG. 11(*b*), the display 151 is bent in the opposite direction of the user and the controller 180 further displays the background screen image on the display 151. Meanwhile, it is noted that transparency of the executed screen image of the Web browsing application is increased and that of the home screen image is reduced according to the bending of the display 151. This is because, in the state of FIG. 11(*a*), transparency of the home screen image is considered to be 100%.

In the state of FIG. 11(*b*), the user further applies force to bend the display 151. Then, as shown in FIG. 11(*c*), the display 151 is further bent in the opposite direction of the user and the controller 180 further increases transparency of the executed screen image of the Web browsing application and reduces that of the home screen image.

Meanwhile, in FIG. 11(*c*), it is noted that transparency of the Web browsing application is increased to be 70% greater than 50% as a threshold value. Then, the controller 180 deactivates the executed screen image of the Web browsing application and activates the home screen.

When the user touches to click a particular icon displayed on the activated home screen as shown in FIG. 12(*a*), the controller 180 may execute an application corresponding to the particular icon as shown in FIG. 12(*b*).

Figure 13:
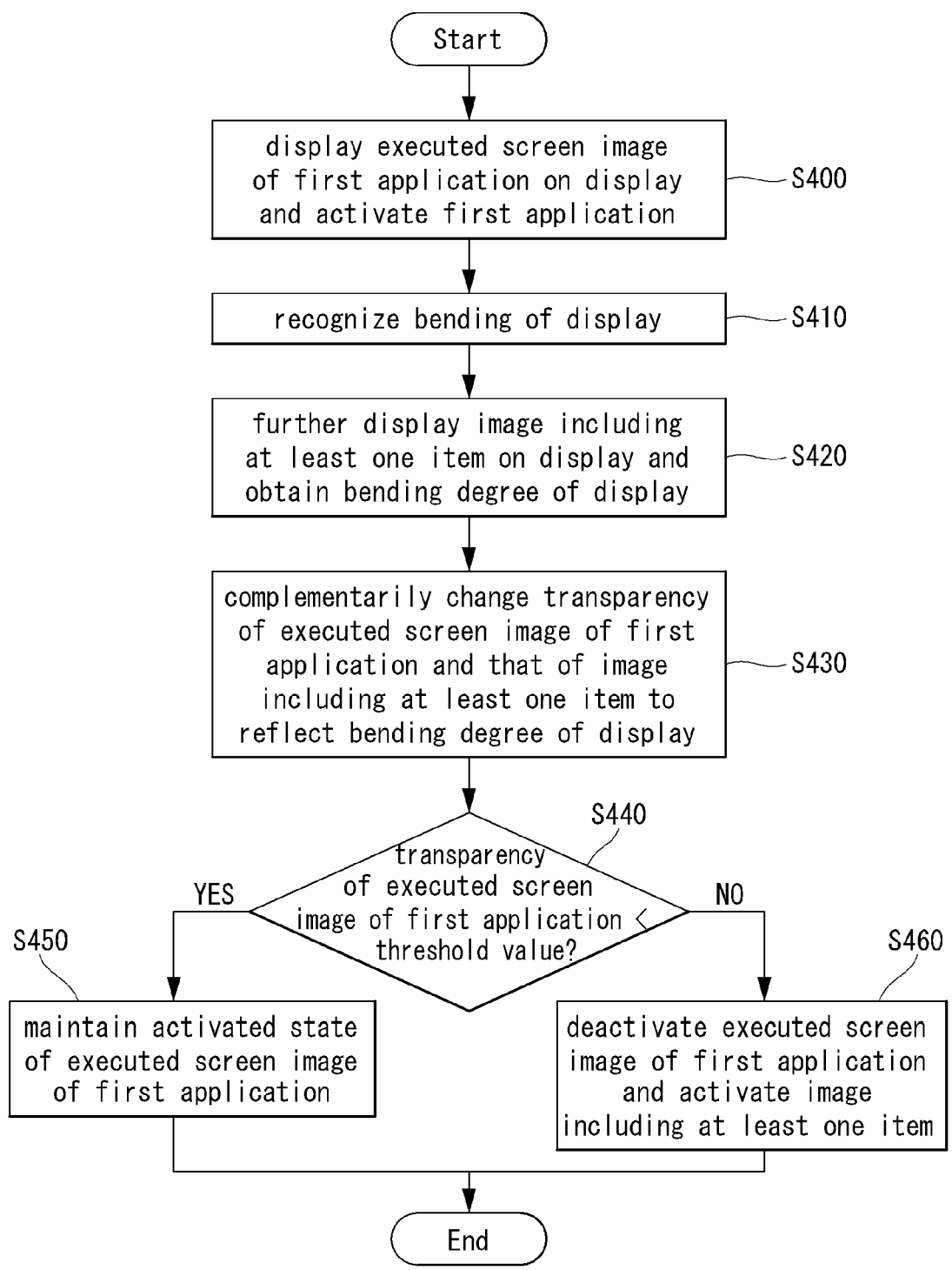
FIG. 13 is a flow chart illustrating another example of the method for driving a mobile terminal illustrated in FIG. 2.

FIG. 13 is a flow chart illustrating another example of the method for driving the mobile terminal 100 illustrated in FIG. 2. The method for driving the mobile terminal will be described with reference to the relevant drawings.

The controller 180 executes a first application on the display 151 and activates the first application (S400). When the display 151 is implemented as a touch screen, the user may execute various functions of the first application through a touch with respect to the executed screen image of the first application.

With the executed screen image of the first application displayed, bending of the display 151 is recognized (S410). Then, the controller 180 may further display a screen image including at least one item on the display 151, and obtains a bending degree of the display 151 (S420).

Here, each of the at least one item may be an execution icon of the particular application as shown in FIG. 6, a widget for executing a particular function, or an executed screen image of a particular pre-set application to execute a particular application when selected. However, coverage of the present invention is not limited thereto.

When the bending degree of the display 151 is obtained, the controller 180 may complementarily change the transparency of the executed screen image of the first application and that of the screen image including at least one item to reflect the bending degree of the display 151 (S430).

When the transparency of the executed screen image of the first application is lower than a predetermined threshold value according to the results obtained by changing the transparency of the executed screen image of the first application and that of the screen image including at least one item (S440), the controller 180 maintains the activation state of the executed screen image of the first application (S450).

However, when the transparency of the executed screen image of the first execution is equal to or higher than a predetermined threshold value according to the results obtained by changing the transparency of the executed screen image of the first application and that of the screen image including at least one item (S440), the controller 180 deactivates the executed screen image of the first application and activates the screen image including at least one item (S460).

Then, the user may select any one among the at least one item through a touch with respect to the display 151 implemented as a touch screen, and execute a particular function corresponding to the selected item. For example, the user may touch an execution icon of a particular application displayed on the display 151 to execute the particular application, may touch a particular widget displayed on the display 151 to execute a particular function corresponding to the particular widget, or may touch an executed screen image of a particular application displayed on the display 151 to execute the particular application. However, the particular functions that may be executed upon selecting an item displayed on the display 151 are not limited to the foregoing examples.

As described above, the electronic device 100 according to an embodiment of the present invention can provide the user interfacing function of selectively activating a particular function in a state in which the executed screen image of the first application is displayed, based on the transparency of the executed screen image of the first application, while complementarily changing the transparency of the executed screen image of the first application and that of the screen image including at least one item displayed on the display 151 by using the bending information of the display 151.

FIGS. 14 and 15 are views showing an example of changing screen images according to the method for driving the mobile terminal 100 illustrated in FIG. 13. For reference, FIGS. 14 and 15 show an example of executing a particular function in a state in which an executed screen image of a currently executed application is displayed on the display 151 by using bending of the display 151.

FIG. 14(*a*) shows a state in which an executed screen image of a game application is displayed and the game application is activated. Namely, the user may execute various functions related to the game application through a touch with respect to the display 151 implemented as a touch screen.

In the state of FIG. 14(*a*), the user applies force to bend the display 151. Then, as shown in FIG. 14(*b*), the display 151 is bent in the opposite direction of the user and the controller 180 further displays an image including a plurality of items on the display 151.

As shown in FIG. 14(*b*), an item displayed on the display 151 may be an executed screen image of a particular application such as an executed screen image of a real-time messaging application or an executed screen image of a Web browsing application or may be a folder including a plurality of application execution icons.

Meanwhile, through the bending of the display 151, transparency of the executed screen image of the game application is increased and that of the image including a plurality of items is reduced. This is because, in the state of FIG. 14(*a*) in which the plurality of execution icons are not displayed, transparency of the image including a plurality of items is considered to be 100%.

In the state of FIG. 14(*b*), the user further applies force to bend the display 151. Then, as shown in FIG. 15(*a*), the display 151 is further bent in the opposite direction of the user, and the controller 180 further increases transparency of the executed screen image of the game application and reduces that of the image including a plurality of items.

Meanwhile, in FIG. 15(*a*), it is noted that transparency of the game application is increased to be 70% greater than 50% as a threshold value. Then, the controller 180 deactivates the executed screen image of the game application and activates the image including a plurality of items. Then, as shown in FIG. 15(*b*), the user may touch the executed screen image of the Web browsing application through a touch with respect to the display 151 to display the executed screen image of the Web browsing application on the display 151, while executing the Web browsing application.

When the user touches the executed image of the real-time messaging application, the controller 180 may execute the real-time messaging application, and when the user touches the folder, the controller 180 may open the folder and display content included in the folder on the display 151.

Figure 16:
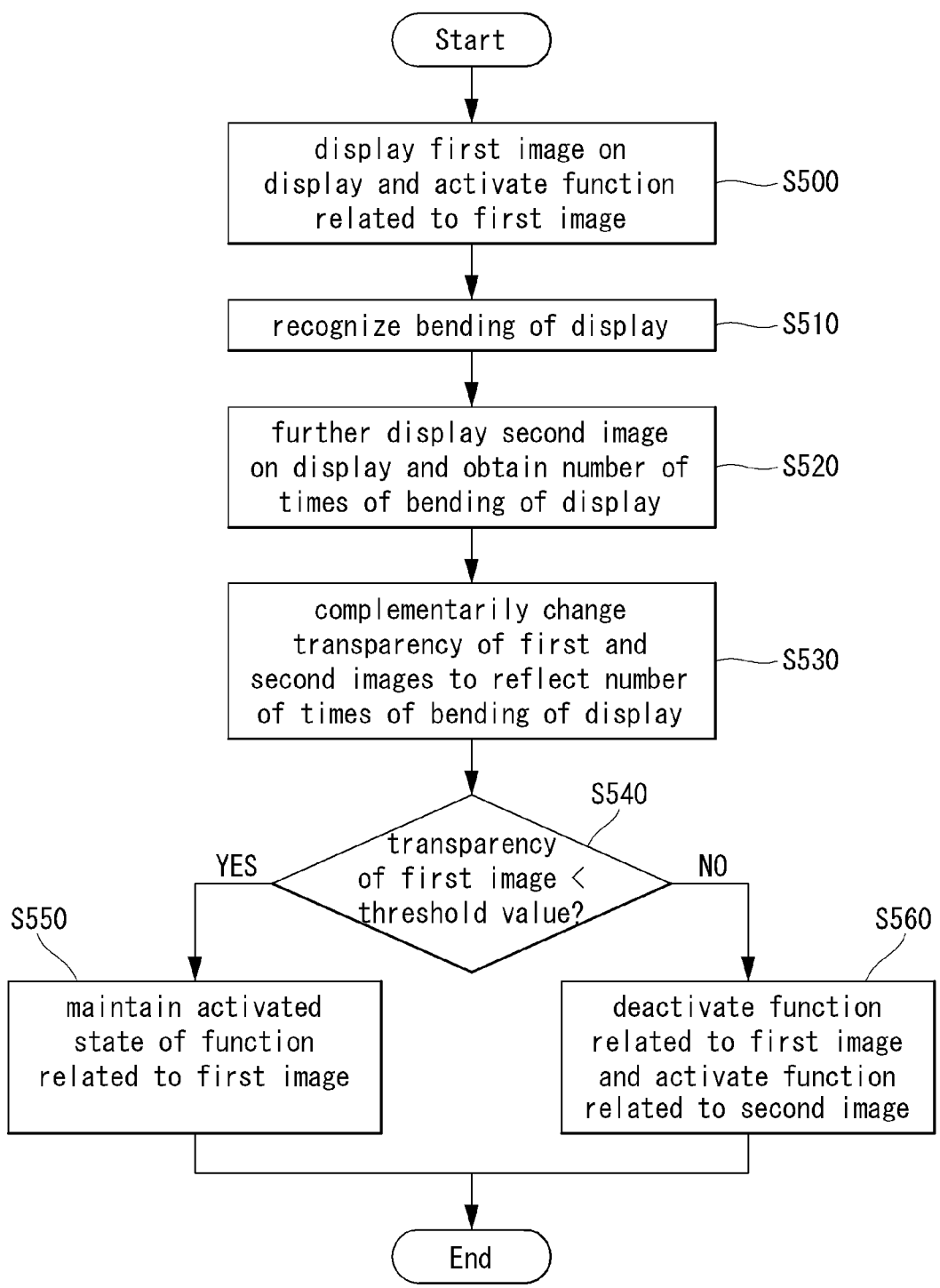
FIG. 16 is a flow chart illustrating another example of the method for driving a mobile terminal illustrated in FIG. 2.

FIG. 16 is a flow chart illustrating another example of the method for driving the mobile terminal 100 illustrated in FIG. 2. The method for driving the mobile terminal 100 will be described with reference to relevant drawings.

The controller 180 displays a first image on the display 151 and activates a function related to the first image (S500). With the first image displayed, bending of the display 151 is recognized (S510). Then, the controller 180 further displays a second image on the display 151 and obtains the number of times of bending of the display 151 (S520).

When the number of times of bending of the display 151 is obtained, the controller 180 may complementarily change the transparency of the first image and that of the second image to reflect the number of times of bending of the display 151 (S530). Steps S540 to S560 of determining whether to maintain the activated state of the function related to the first image or whether to activate a function related to the second image according to the results obtained by changing the transparency of the first image and that of the second image are the same as those described above with reference to FIG. 2. Thus, a description of steps S540 to S560 will be omitted.

As described above, the electronic device 100 according to an embodiment of the present invention can provide the user interfacing function of selectively activating the function related to the first image and the function related to the second image based on the transparency of the first image, while complementarily changing the transparency of the first image and that of the second image displayed on the display 151 by using the number of times of bending of the display 151.

FIG. 17 is a view showing an example of changing transparency of images displayed on a display based on the number of times of bending of the display according to the method for driving the mobile terminal 100 illustrated in FIG. 16. For reference, it is assumed that the display 151 is a display having restoration elastic force, namely, having such characteristics that it is restored to the original flat state when force applied by the user to bend it is removed.

In a state (a) in which the display 151 is in a flat state, transparency of a first image is 0% and that of a second image is 100%, the user applies force to bend the display 151. Then, the display 151 is bent into a state (b) in which transparency of the first image is increased to be 20% and that of the second image is reduced to be 80%. Namely, according to the first bending of the display 151, the second image is displayed on the display 151 and transparency of each image is increased or reduced by 20% each time the display 151 is bent.

In the state (b) in which the display 151 is bent, the user removes force applied to the display 151. Then, the display 151 is restored to the flat state, like a state (c), from the bending state. Here, transparency of each image is maintained as it is.

In the states (c) to (f) illustrated in FIG. 7, as the number of times of bending of the display 151 is increased, transparency of the first image is increased and that of the second image is decreased like in the foregoing states (a) to (c). Here, in a state (f) in which transparency of the first image is 50% as a threshold value or more, or thereafter, the function related to the first image is deactivated and the function related to the second image is activated.

Figure 18:
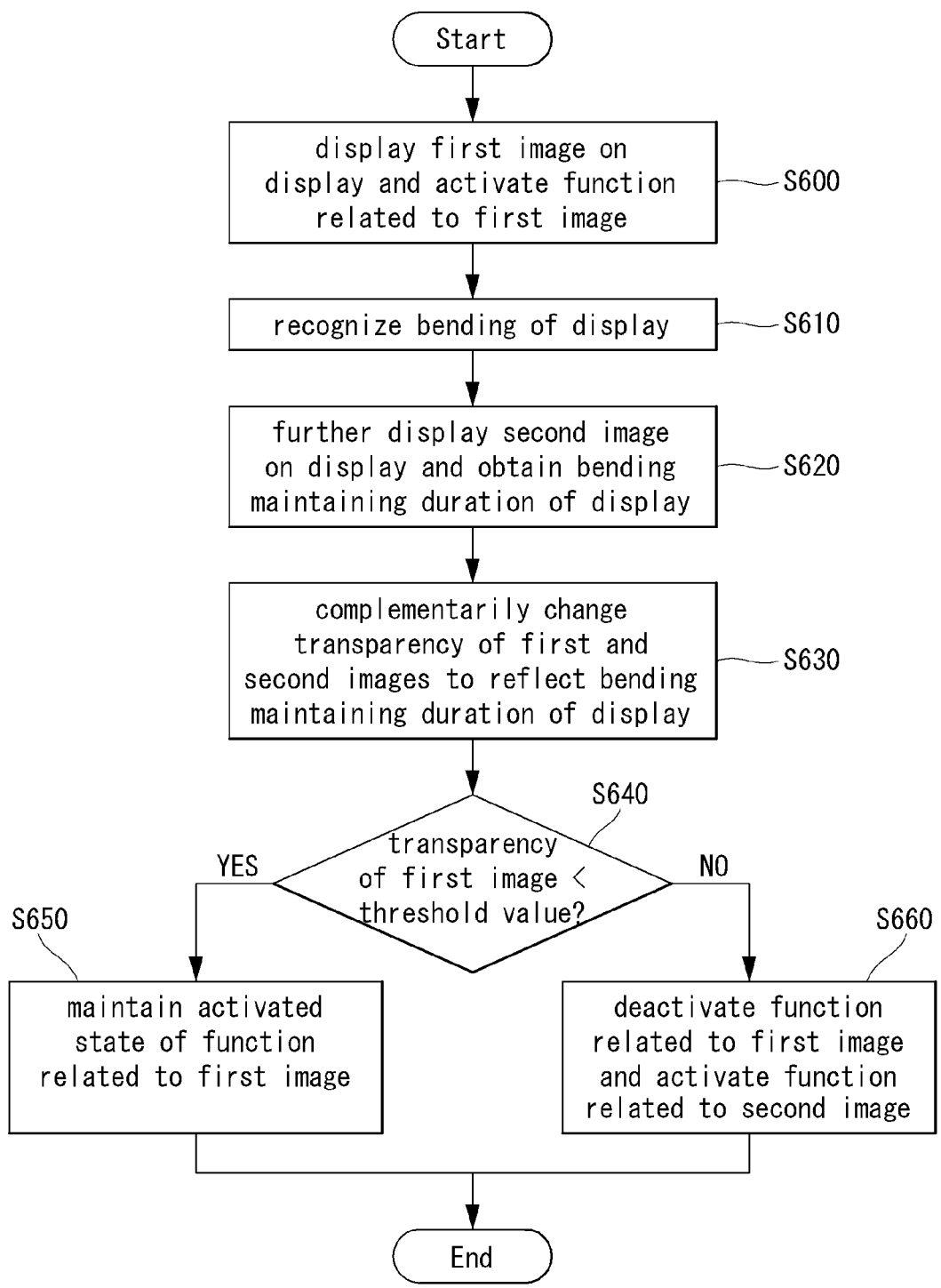
FIG. 18 is a flow chart illustrating another example of the method for driving a mobile terminal illustrated in FIG. 2.

FIG. 18 is a flow chart illustrating another example of the method for driving the mobile terminal 100 illustrated in FIG. 2. The method for driving the mobile terminal 100 will be described with reference to relevant drawings.

The controller 180 displays a first image on the display 151 and activates a function related to the first image (S600). With the first image displayed, bending of the display 151 is recognized (S610). Then, the controller 180 further displays a second image on the display 151 and obtains a bending maintaining duration of the display 151 (S620).

The controller 180 complementarily changes the transparency of the first image and that of the second image to reflect the bending maintaining duration of the display 151 (S630). Steps S640 to S660 of determining whether to maintain the activated state of the function related to the first image or whether to activate a function related to the second image according to the results obtained by changing the transparency of the first image and that of the second image are the same as those described above with reference to FIG. 2. Thus, a description of steps S640 to S660 will be omitted.

As described above, the electronic device 100 according to an embodiment of the present invention can provide the user interfacing function of selectively activating the function related to the first image and the function related to the second image based on the transparency of the first image, while complementarily changing the transparency of the first image and that of the second image displayed on the display 151 by using the bending maintaining duration of the display 151.

FIG. 19 is a view showing an example of changing transparency of images displayed on a display based on a bending maintaining duration of the display according to the method for driving the mobile terminal 100 illustrated in FIG. 18.

The display 151 may be a display having restoration elastic force. Thus, in order to maintain a bending state of the display 151, the user must maintain force applied to the display 151 in order to maintain the bending state of the display 151.

In comparison, the display 151 may not have restoration elastic force. Then, although the user removes force applied to the display 151 to bend the display 151, the display 151 may be maintained in the bending state. However, in order to change the display 151 from the bending state to a flat state, the user should apply force in a direction opposite to that of force which has been applied to the display 151 to bend the display 151.

In a state (a) in which the display 151 is in a flat state, transparency of a first image is 0% and that of a second image is 100%, the user applies force to bend the display 151. Then, the display 151 is bent into a state (b) in which transparency of the first image is increased to be 10% and that of the second image is reduced to be 90%.

When the bending maintaining duration of the display 151 is 3 seconds, transparency of each image is not changed. In and after the state (b), as the bending maintaining duration of the display 151 is gradually increased, transparency of each image is increased or decreased by 10% during every 3 seconds of bending maintaining duration.

Meanwhile, in and after a state (f) in which transparency of the first image is 50% as a threshold value or more, the function related to the first image is deactivated and the function related to the second image is activated.

Figure 20:
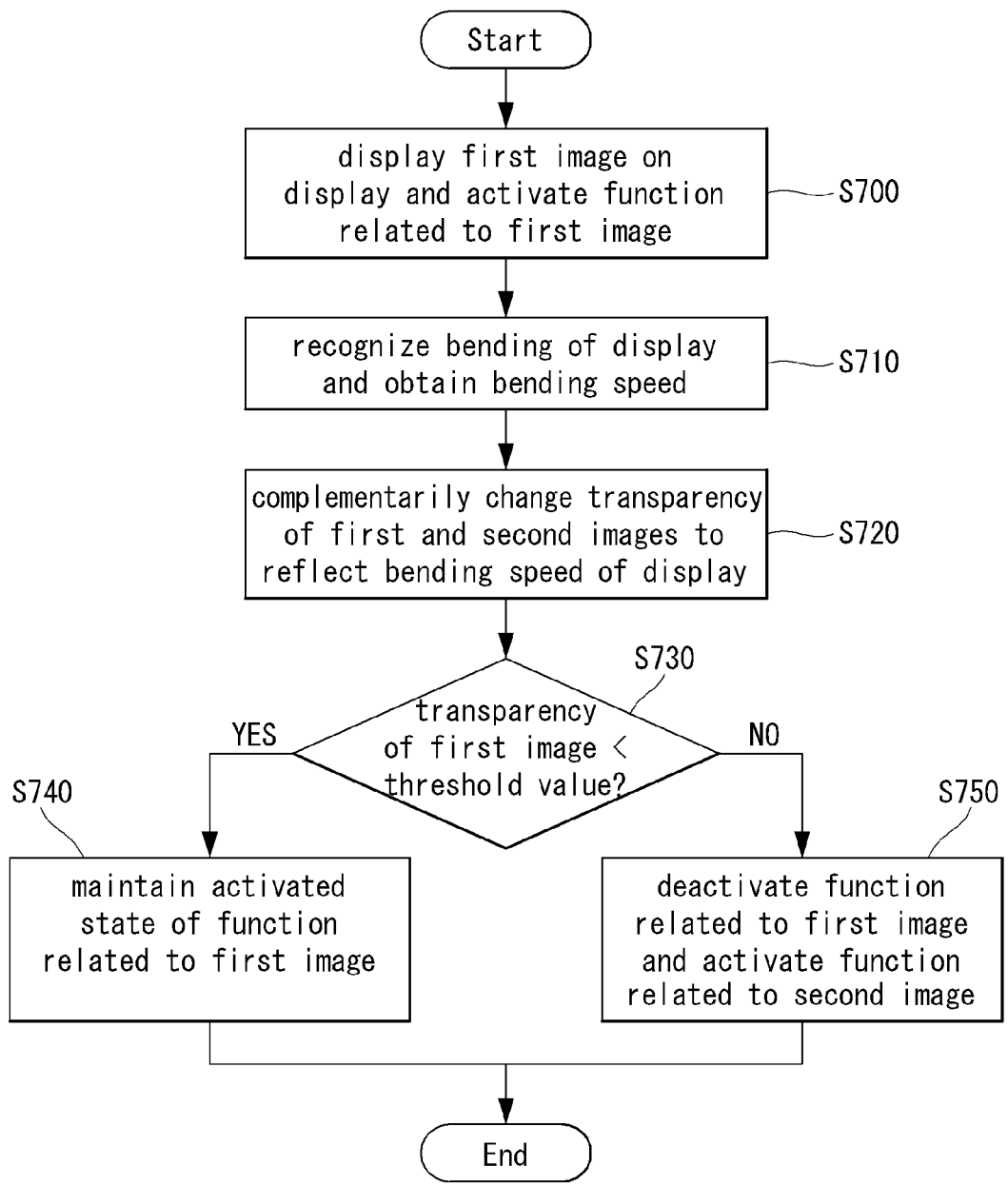
FIG. 20 is a flow chart illustrating another example of the method for driving a mobile terminal illustrated in FIG. 2.

FIG. 20 is a flow chart illustrating another example of the method for driving the mobile terminal 100 illustrated in FIG. 2. The method for driving the mobile terminal 100 will be described with reference to relevant drawings.

The controller 180 displays a first image on the display 151 and activates a function related to the first image (S700). With the first image displayed, when bending of the display 151 is recognized, the controller 180 obtains a bending speed of the display 151 through the sensing unit 140 (S710).

Thereafter, the controller 180 complementarily changes the transparency of the first image and that of the second image to reflect the bending speed of the display 151 (S720). For example, the controller 180 may increase a transparency increase speed of the first image and a transparency decrease speed of the second image as the bending speed of the display 151 is low, or may decrease the transparency increase speed of the first image and the transparency decrease speed of the second image as the bending speed of the display 151 is high.

Steps S730 to S750 of determining whether to maintain the activated state of the function related to the first image or whether to activate a function related to the second image according to the results obtained by changing the transparency of the first image and that of the second image are the same as those described above with reference to FIG. 2. Thus, a description of steps S730 to S750 will be omitted.

As described above, the electronic device 100 according to an embodiment of the present invention can provide the user interfacing function of selectively activating the function related to the first image and the function related to the second image based on the transparency of the first image, while complementarily changing the transparency of the first image and that of the second image displayed on the display 151 by using the bending speed of the display 151.

Figure 21:
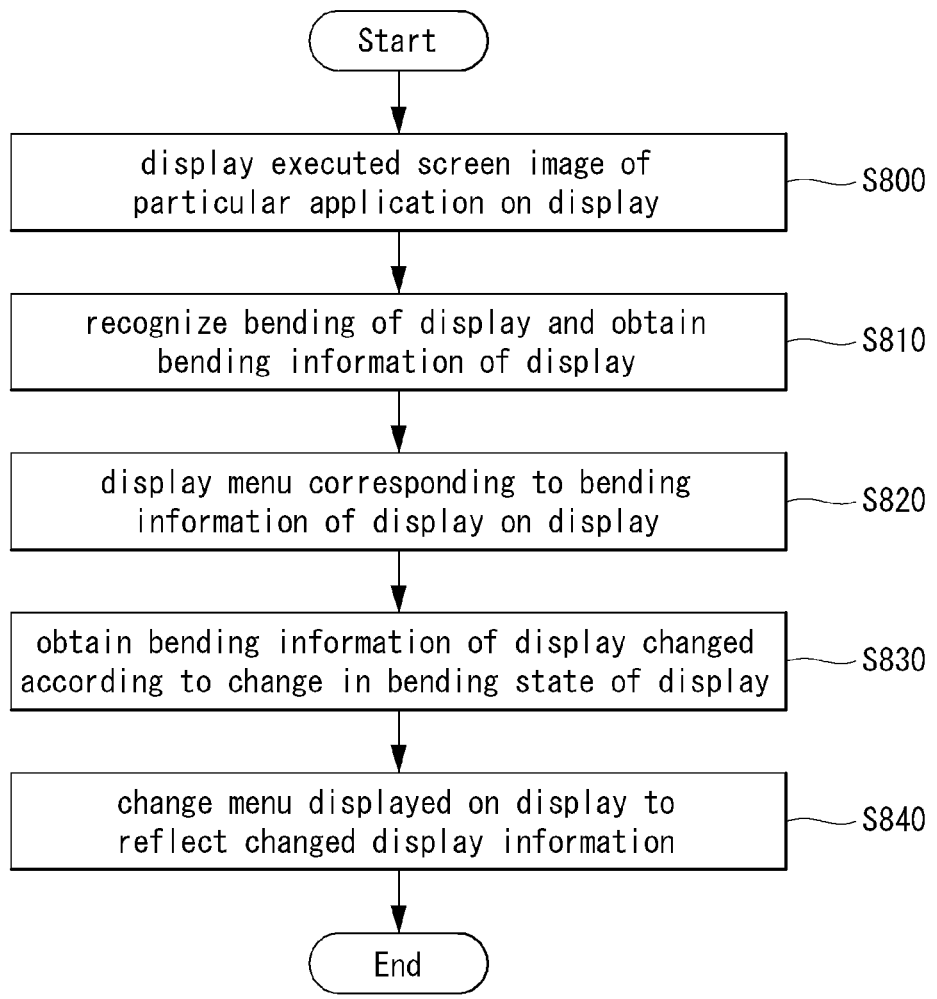
FIG. 21 is a flow chart illustrating another example of a method for driving an electronic device according to an embodiment of the present invention.

FIG. 21 is a flow chart illustrating another example of a method for driving the electronic device 100 according to an embodiment of the present invention. The method for driving the electronic device 100 will be described with reference to relevant drawings.

When a particular application is executed, the controller displays an executed screen image of the particular application on the display (S800). Meanwhile, the executed screen image of the particular application may include a basic menu of the particular application.

With the executed screen image of the particular application displayed on the display 151, when bending of the display 151 is recognized, the controller 180 obtains bending information of the display 151 sensed by the sensing unit 140 (S810).

When the bending information of the display 151 is obtained, the controller 180 displays the menu corresponding to the obtained bending information of the display 151 on the display 151 (S820). The menu corresponding to the bending information may be a menu additionally displayed on the display 151.

With the menu corresponding to the bending information displayed on the display 151, when the bending state of the display 151 is changed, the controller 180 obtains the changed bending information of the display 151 according to the change in the bending state of the display 151 (S830).

And then, the controller 180 may change the menu displayed on the display 151 to a different menu to reflect the changed bending information of display 151. Hereinafter, specific examples of changing a menu displayed on the display 151 according to a change in bending information of the display 151 will be described with reference to FIGS. 2 to 27.

Figure 22:
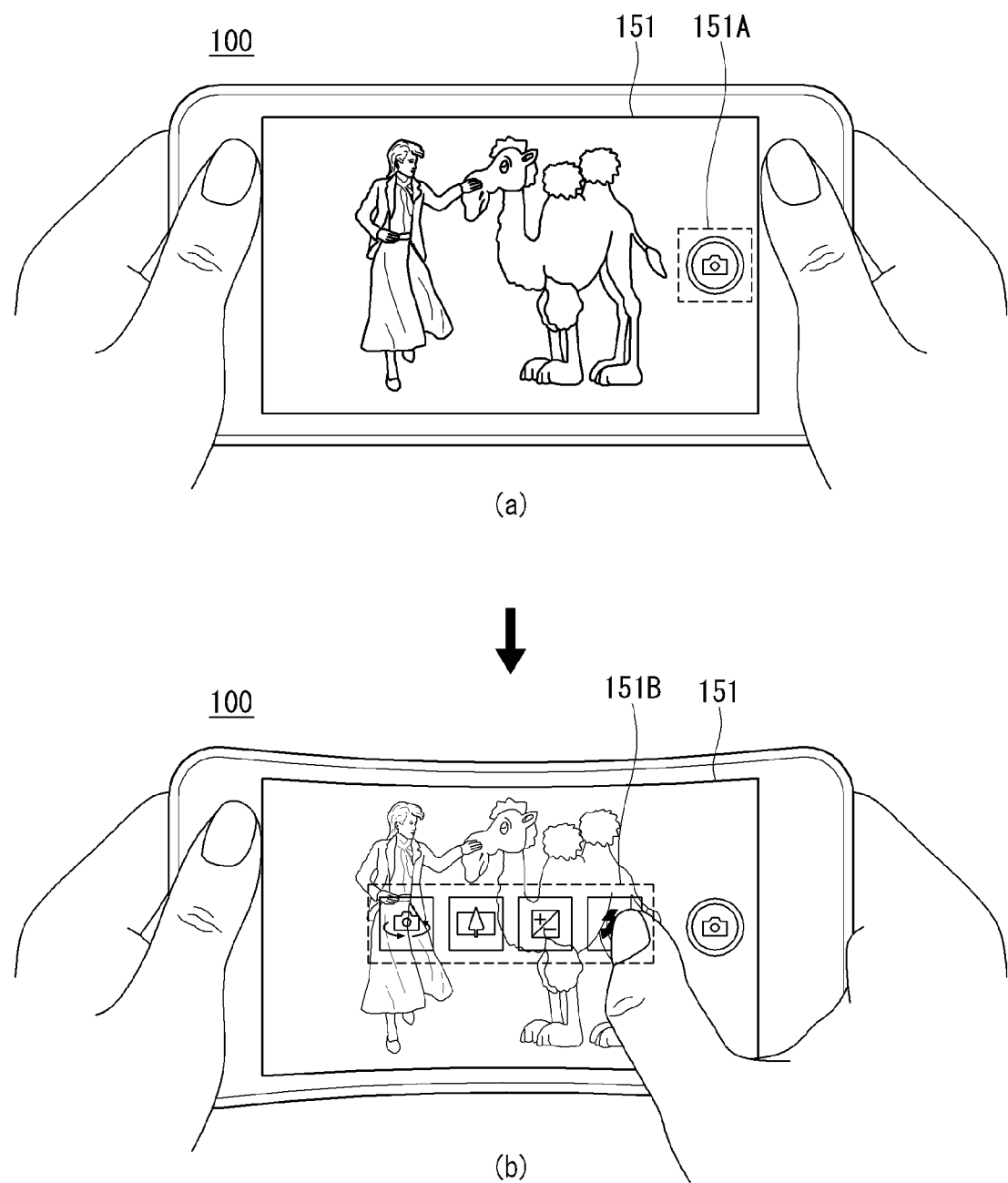
FIG. 22 is a view showing an example of displaying additional menus on an executed screen image of a particular application based on bending of the display.

FIG. 22 is a view showing an example of displaying additional menus on an executed screen image of a particular application based on bending of the display.

FIG. 22(*a*) shows that a camera application is executed to display a view finder for capturing an image and a basic menu 151A used for capturing an image on the display 151.

In the state of FIG. 22(*a*), the user applies force to bend the display 151. Then, as shown in FIG. 22*b*), the display 151 is bent in the opposite direction of the user and the controller 180 further displays an additional menu 151B for performing supplementary functions of the camera application on the display 151.

FIG. 23 is a view showing an example of changing menus displayed on the display 151 according to a bending degree of the display 151.

With reference to FIG. 23(*a*), when bending of the display 151 is not recognized, the electronic device 100 according to an embodiment of the present invention displays a basic menu of a particular application on the display 151. However, when bending of the display 151 is recognized, as shown in FIGS. 23(*b*) and (*c*), the electronic device 100 may change the menu displayed on the display 151 from the basic menu to a first menu and a second menu according to a bending degree of the display 151.

FIG. 24 is a view showing an example of changing menus displayed on the display 151 according to the number of times of bending of the display 151.

With reference to FIG. 24(*a*), when bending of the display 151 is not recognized, the electronic device 100 according to an embodiment of the present invention displays a basic menu of a particular application on the display 151. However, when bending of the display 151 is recognized, as shown in FIGS. 24(*b*), (*c*), and (*d*), the electronic device 100 may change the menu displayed on the display 151 from the basic menu to a first menu and a second menu according to a bending degree of the display 151.

FIG. 25 is a view showing an example of changing menus displayed on the display 151 according to a bending maintaining duration of the display 151.

With reference to FIG. 25(*a*), when bending of the display 151 is not recognized, the electronic device 100 according to an embodiment of the present invention displays a basic menu of a particular application on the display 151. However, when bending of the display 151 is recognized, as shown in FIGS. 25(*b*), (*c*), and (*d*), the electronic device 100 may change the menu displayed on the display 151 from the basic menu to a first menu, a second menu, and a third menu according to a bending maintaining duration of the display 151.

FIG. 26 is a view showing an example of changing menus displayed on the display 151 according to a bending position of the display 151.

With reference to FIG. 26(*a*), when bending of the display 151 is not recognized, the electronic device 100 according to an embodiment of the present invention displays a basic menu of a particular application on the display 151. However, when bending of the display 151 is recognized, as shown in FIGS. 26(*b*), (*c*), and (*d*), the electronic device 100 may change the menu displayed on the display 151 from the basic menu to a first menu, a second menu, and a third menu according to a bending position of the display 151.

FIG. 27 is a view showing an example of changing menus displayed on the display according to a bending direction of the display.

With reference to FIG. 27(*a*), when bending of the display 151 is not recognized, the electronic device 100 according to an embodiment of the present invention displays a basic menu of a particular application on the display 151. However, when bending of the display 151 is recognized, as shown in FIGS. 27(*b*) and (*c*), the electronic device 100 may change the menu displayed on the display 151 from the basic menu to a first menu and a second menu according to a bending direction of the display 151.

Also, in the embodiments illustrated in FIGS. 22 to 27, transparency of an executed screen image of a particular application and that of a menu of the particular application displayed on the display 151 may be complementarily changed according to bending information of the display 151.

For example, the controller 180 may complementarily change transparency of the executed screen image of the particular application and that of the particular menu of the particular application based on a bending degree of the display 151. Here, the controller 180 may change the particular menu of the particular application displayed on the display 151 according to a bending maintaining duration at the particular bending degree of the display 151.

Also, the controller 180 may complementarily change transparency of the executed screen image of the particular application and that of the particular menu of the particular application based on a bending maintaining duration at a particular bending degree of the display 151. Here, the controller 180 may change the particular menu of the particular application displayed on the display 151 as the bending degree of the display 151 is changed.

Meanwhile, the controller 180 may control activation of a function corresponding to the particular menu of the particular application based on transparency of the executed screen image of the particular application.

As described above with reference to FIGS. 21 to 27, the electronic device 100 according to an embodiment of the present invention can provide a user interfacing function allowing the user to quickly access menus and feel an interesting factor by changing the menus of a particular application displayed on the display 151 by using the bending information of the display 151.

Figure 28:
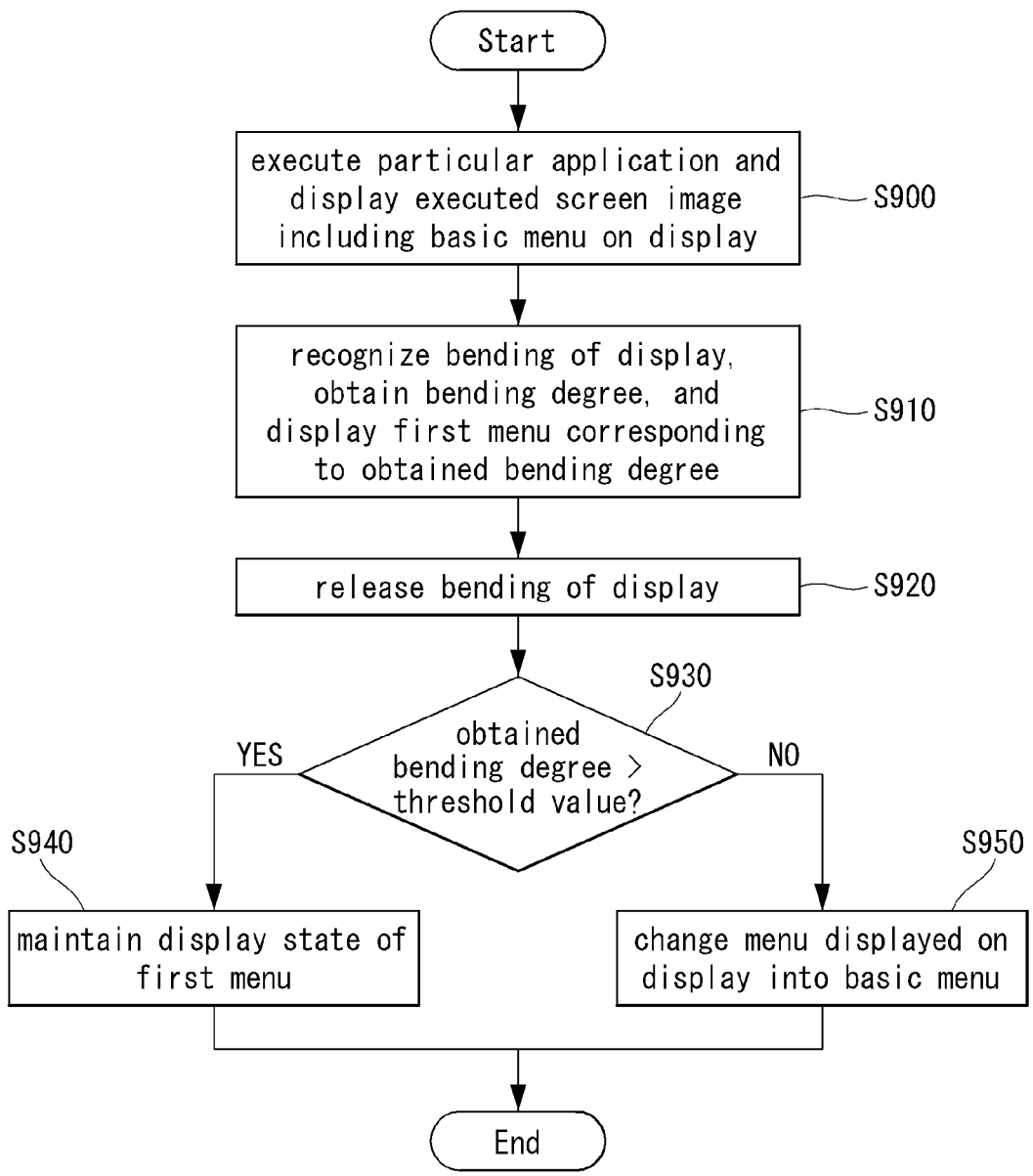
FIG. 28 is a flow chart illustrating another example of the method for driving an electronic device according to an embodiment of the present invention.

FIG. 28 is a flow chart illustrating another example of the method for driving the electronic device 100 according to an embodiment of the present invention. A method for driving the electronic device 100 will be described with reference to relevant drawings.

When a particular application is executed, the controller 180 displays an executed screen image of the particular application including a basic menu on the display 151 (S900). With the executed screen image of the particular application displayed on the display 151, when bending of the display 151 is recognized, the controller 180 obtains a bending degree of the display 151 sensed by the sensing unit 140 and displays a first menu corresponding to the obtained bending degree on the display 151 (S910).

After the first menu is displayed on the display 151, bending of the display 151 is released (S920). Here, when the obtained bending degree of the display 151 is greater than a predetermined threshold value (S930), the controller 180 maintains the display state of the first menu (S940). However, when the obtained bending degree of the display 151 is equal to or smaller than a predetermined threshold value (S930), the controller changes the menu displayed on the display 151 from the first menu to the basic menu (S950).

FIG. 29 is a view showing an example of determining whether to maintain a display state of a menu displayed on the display 151 according to a bending degree of the display 151, when the bending of the display 151 is released according to the method for driving the electronic device 100 illustrated in FIG. 28.

With reference to FIG. 29(*a*), in case in which a bending degree of the display 151 is equal to or smaller than a predetermined threshold value, when the bending of the display 151 is released, the menu displayed on the display 151 is changed from a first menu to a basic menu according to the bending of the display 151.

However, with reference to FIG. 29(*b*), when the bending degree of the display 151 is greater than the threshold value, although the bending of the display 151 is released, a display state of the first menu displayed on the display 151 is maintained.

In FIGS. 28 and 29, a case in which whether to maintain a display state of a menu displayed on the display 151 according to bending is determined according to a bending degree among bending information regarding the display 151 is illustrated. However, the present invention is not limited thereto. For example, whether to maintain a display state of a menu displayed on the display 151 according to bending may also be determined by a bending maintaining duration, the number of times of bending, a bending speed, a bending position, and the like.

Figure 30:
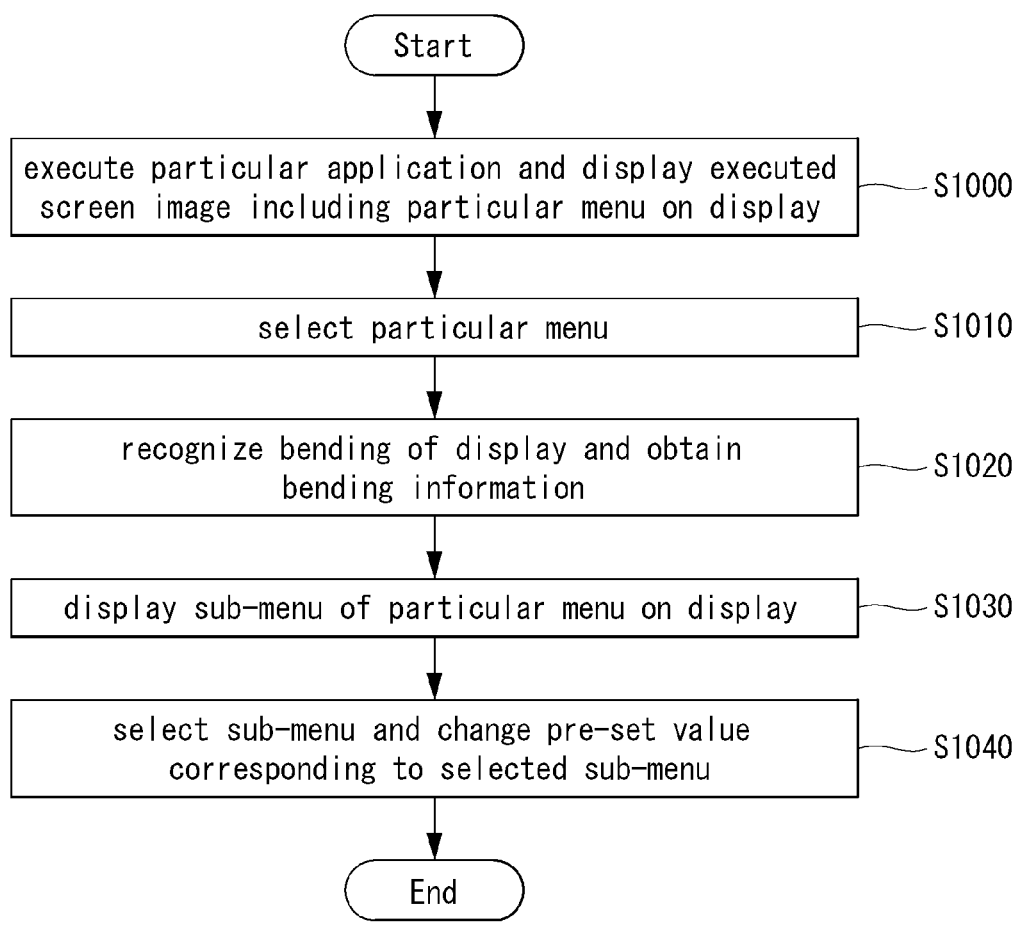
FIG. 30 is a flow chart illustrating another example of a method for driving an electronic device according to an embodiment of the present invention.

FIG. 30 is a flow chart illustrating another example of a method for driving the electronic device 100 according to an embodiment of the present invention. A method for driving the electronic device 100 will be described with reference to relevant drawings.

First, the electronic device 100 executes a particular application and displays an executed screen image of the particular application including the particular menu on the display 151 (S1000). The particular men may include an image-related menu, a sound-related menu, a power management menu, and the like of the electronic device 100. However, coverage of the present invention is not limited thereto.

The particular menu displayed on the display 151 is selected by the user (S1010). With the particular menu selected, when bending of the display 151 is recognized, the controller 180 obtains bending information sensed by the sensing unit 140 (S1020). Thereafter, the controller 180 displays a sub-menu of the particular menu on the display 151 (S1030). Then, the user may select a sub-menu displayed on the display 151 to change a pre-set value corresponding to the selected menu (S1040).

Hereinafter, examples of sub-menus of the particular menu will be described in detail. The sub-menus of an image-related menu of the electronic device 100 may include a brightness adjustment menu of the display 151, a light and shade adjustment menu of the display 151, a color temperature adjustment menu of the display 151, and the like. Sub-menus of the sound-related menu, i.e., a particular menu, of the electronic device 100 may include a volume adjustment menu, a sound balance adjustment, and the like.

Figure 31:
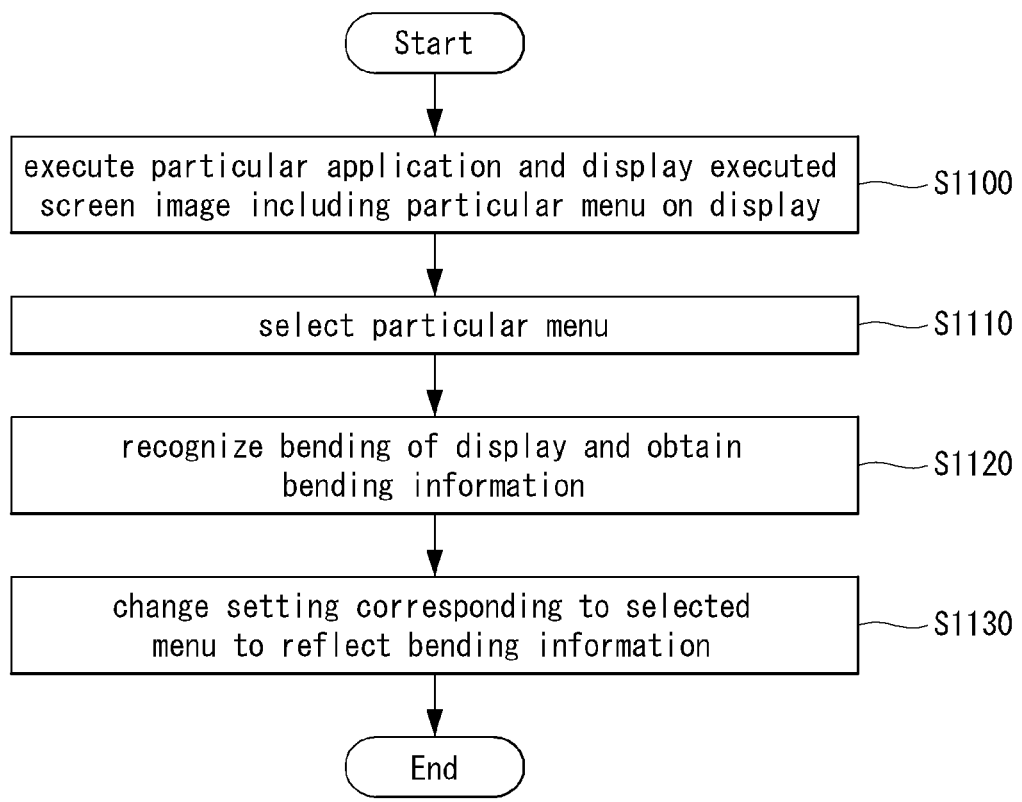
FIG. 31 is a flow chart illustrating another example of a method for driving an electronic device according to an embodiment of the present invention.

FIG. 31 is a flow chart illustrating another example of a method for driving the electronic device 100 according to an embodiment of the present invention. A method for driving the electronic device 100 will be described with reference to relevant drawings.

First, the electronic device 100 executes a particular application and displays an executed screen image of the particular application including the particular menu on the display 151 (S1100). The particular menu displayed on the display 151 is selected by the user (S1110).

With the particular menu selected, when bending of the display 151 is recognized, the controller 180 obtains bending information sensed by the sensing unit 140 (S1120). Then, the controller 180 may change a pre-set value corresponding to the selected menu to reflect the obtained bending information (S1130).

The pre-set value changed based on bending of the display 151 may include an image-related pre-set value of the display 151, a sound-related pre-set value of the electronic device 100, a power management-related pre-set value of the electronic device 100, and the like. However, coverage of the present invention is not limited thereto.

Figure 32:
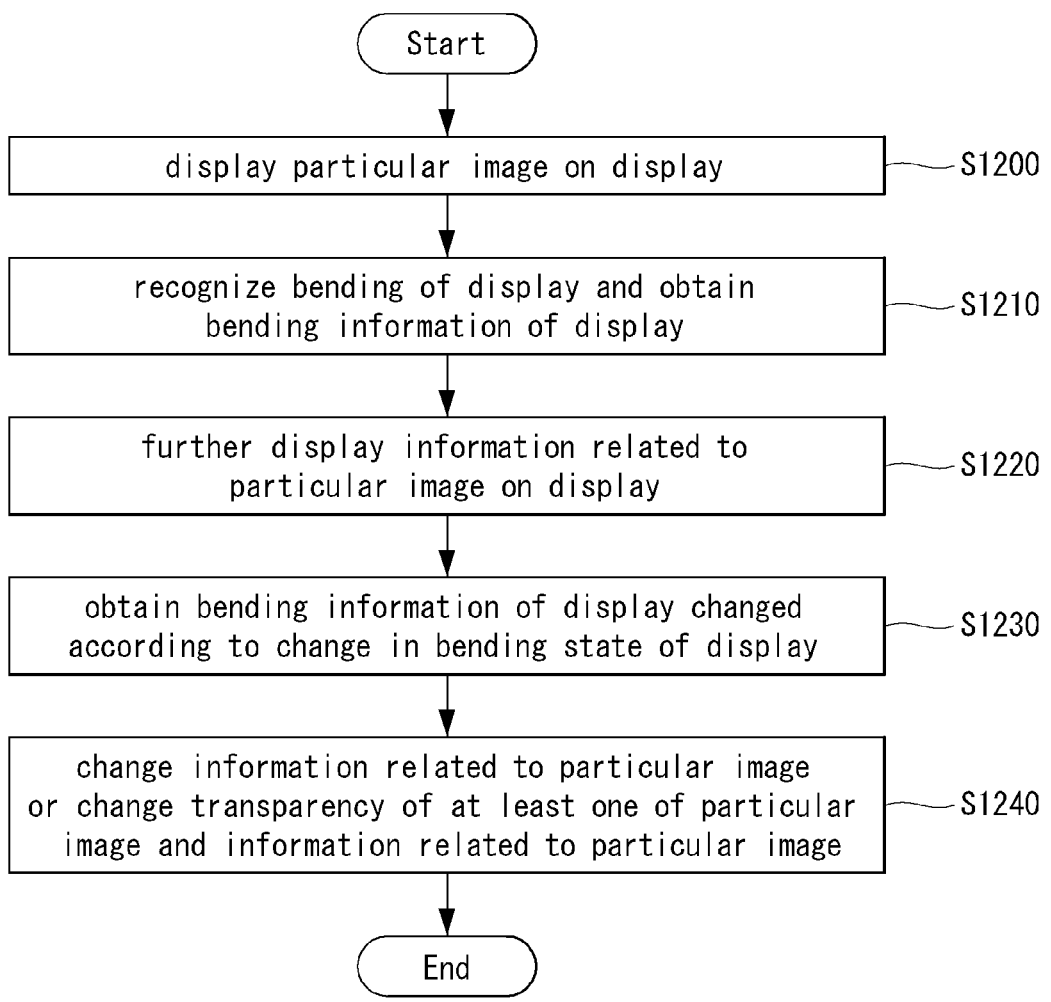
FIG. 32 is a flow chart illustrating another example of a method for driving an electronic device according to an embodiment of the present invention.

FIG. 32 is a flow chart illustrating another example of a method for driving the electronic device 100 according to an embodiment of the present invention. A method for driving the electronic device 100 will be described with reference to relevant drawings.

A particular image is displayed on the display 151 (S1200). Here, the particular image may be an executed screen image of a particular application. With the particular image displayed on the display 151, when bending of the display 151 is recognized, the controller 180 obtains bending information of the display 151 sensed by the sensing unit 140 (S1210).

Then, the controller further displays information related to the particular image on the display 151 (S1220). Here, the information related to the particular image may be information corresponding to the obtained bending information of the display 151.

Meanwhile, the information related to the particular image may include information regarding a particular image itself such as attribution information of the particular image, or the like, an item used for executing a particular function of a particular application, results obtained by executing the particular function of the particular application with respect to the particular image in the particular application, and the like. Here, the item used for executing the particular function may include an icon, an execution button, a menu bar, and the like, used to perform the particular function. However, coverage of the information related to the particular image in the electronic device 100 according to an embodiment of the present invention is not limited to the foregoing examples.

For example, when a bending degree of the display 151 corresponds to a first range, the controller 180 may display attribute information of the particular image previously determined to correspond to the bending degree of the display 151 on the display 151. However, when the bending degree of the display 151 corresponds to a second range, the controller 180 may display an item which is previously determined to correspond to the bending degree of the display 151 and executes a particular function of a particular application used to display the particular image, on the display 151.

With the information related to the particular image displayed, the user changes force applied to the display 151. Then, the controller 180 obtains changed bending information of the display 151 according to a change in a bending state of the display 151 sensed by the sensing unit 140 (S1230).

Thereafter, the controller 180 changes the information related to the particular image displayed on the display 151 or changes transparency of at least one of the particular image and the information related to the particular image to reflect the changed bending information of the display 151 (S1240).

Meanwhile, the controller 180 may complementarily change the transparent of the particular image and that of information related to the particular image to reflect the changed bending information of the display 151.

Figure 33:
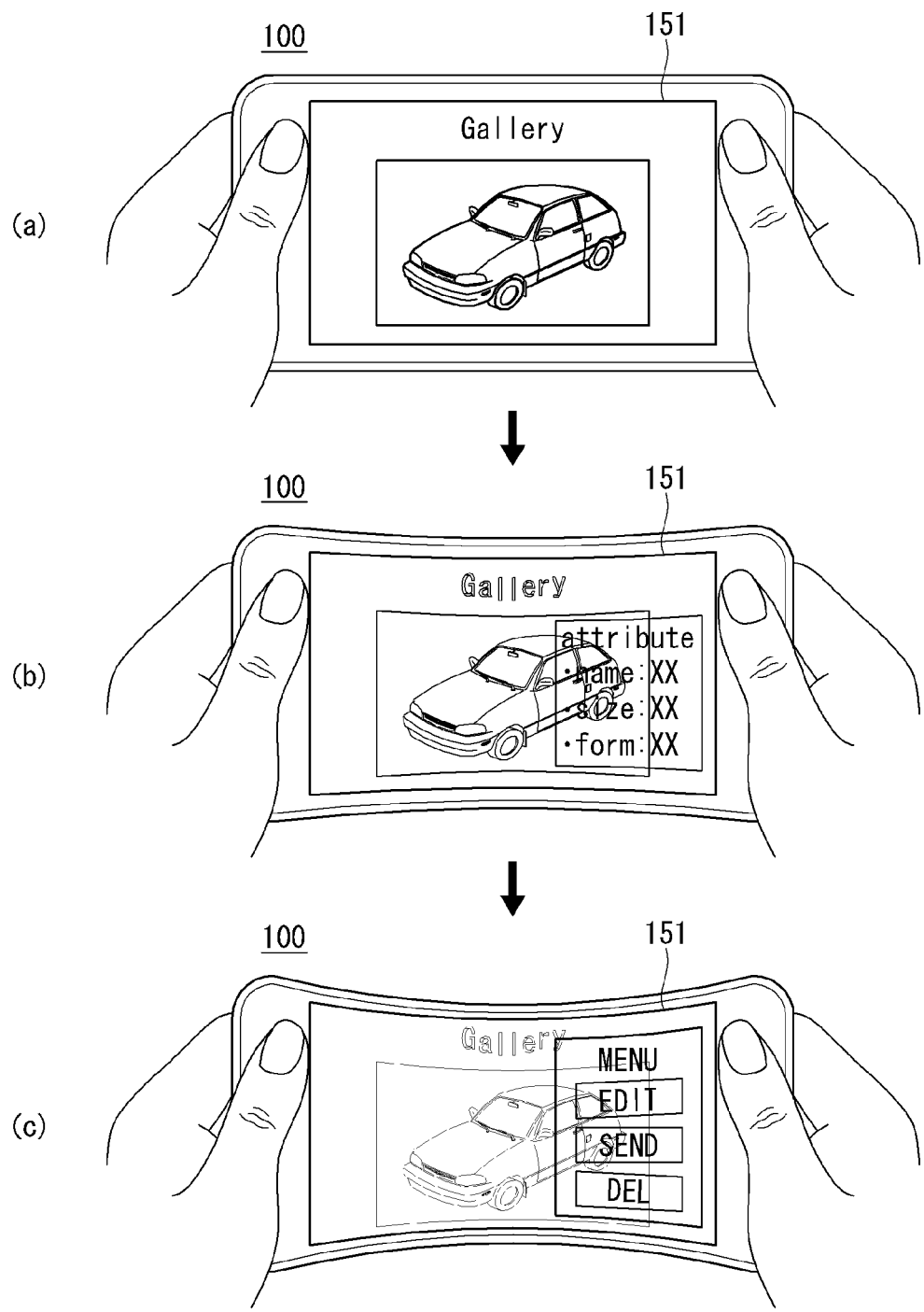
FIG. 33 is a view showing an example of changing information related to a particular image displayed on the display according to bending of the display, according to the method for driving an electronic device illustrated in FIG. 32.

FIG. 33 is a view showing an example of changing information related to a particular image displayed on the display 151 according to bending of the display 151, according to the method for driving the electronic device 100 illustrated in FIG. 32.

FIG. 33(a) shows that an image view application is executed to display a particular image file on the display 151. In the state of FIG. 22(a), the user applies force to bend the display 151. Then, the display 151 is bent in the opposite direction of the user as shown in FIG. 33(b) and the controller 180 additionally displays attribute information of the particular image, i.e., information related to the particular image, on the display 151.

In the state of FIG. 33(b), the user applies force to bend the display 151. Then, as shown in FIG. 33(c), the display 151 is further bent in the opposite direction of the user and the controller 180 additionally displays a menu for performing a function of editing, deleting, or transmitting the particular image, different information related to the particular image on the display 151.

Figure 34:
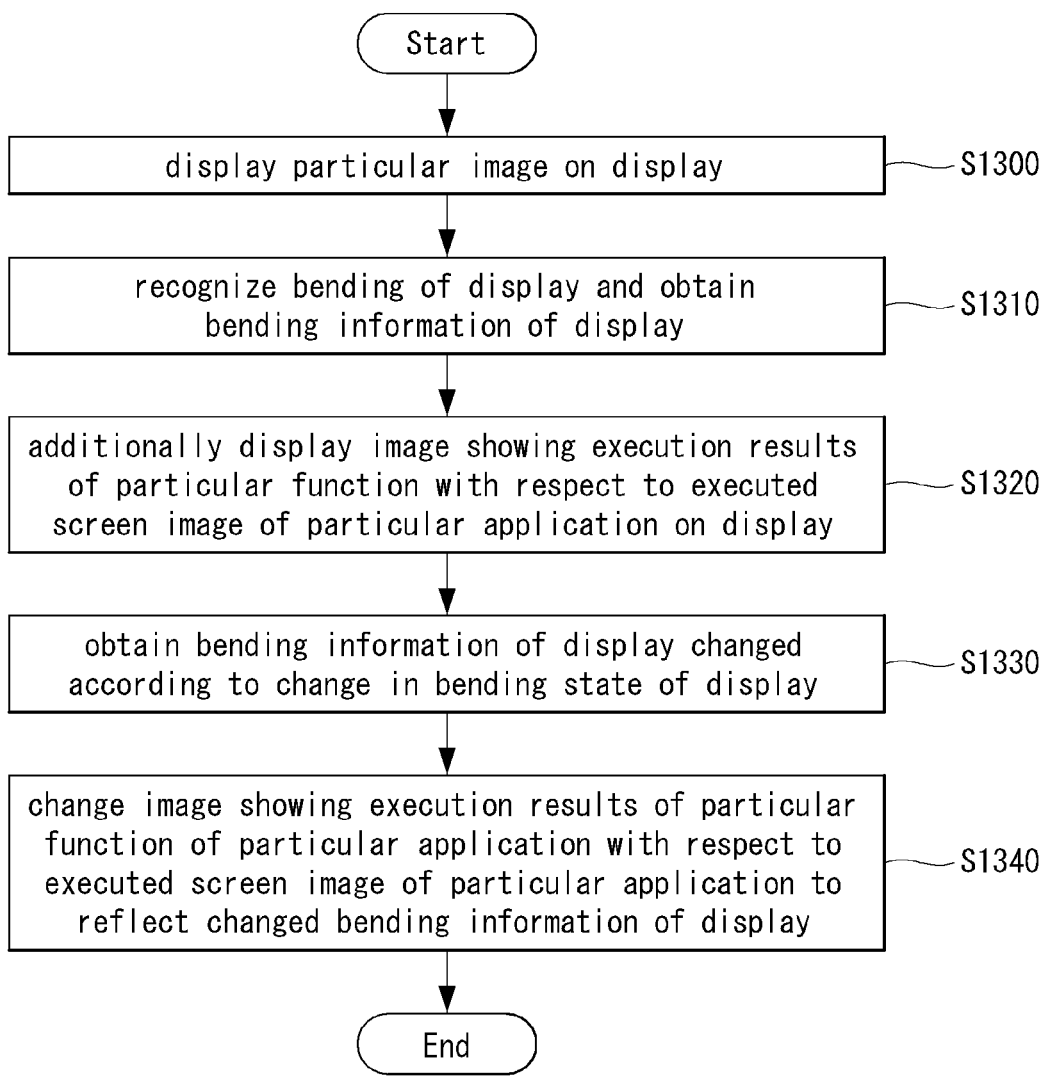
FIG. 34 is a flow chart illustrating an example of the method for driving an electronic device illustrated in FIG. 32.

FIG. 34 is a flow chart illustrating an example of the method for driving the electronic device 100 illustrated in FIG. 32. For reference, an executed screen image of a particular application of FIG. 34 corresponds to the particular image of FIG. 32, and an image showing execution results of a particular function of a particular application corresponds to the information related to the particular image of FIG. 32. This is the same as in FIG. 36. A method for driving the electronic device 100 will be described with reference to relevant drawings.

When a particular application is executed by the user, an executed screen image of the particular application is displayed on the display 151 (S1300). With the executed screen image of the particular application displayed on the display 151, when bending of the display 151 is recognized, the controller 180 obtains bending information of the display 151 sensed by the sensing unit 140 (S1310).

Then, the controller 180 further displays an image showing the execution results of the particular function of the particular application with respect to the executed screen image of the particular application, on the display 151 (S1320).

With the information related to the particular image additionally displayed, the user changes force applied to the display 151. Then, the controller 180 obtains changed bending information of the display 151 according to the change in the bending state of the display 151 sensed by the sensing unit 140 (S1330).

Thereafter, the controller 180 changes an image showing the execution results of the particular function of the particular application with respect to the executed screen image of the particular application displayed on the display 151 to reflect the changed bending information of the display 151 (S1340). Here, the method of changing the image showing the execution results of the particular function with respect to the executed screen image of the particular application may include a method of changing a type of the particular function of the particular application, a method of changing a parameter applied to execution of the particular function, and the like. However, coverage of the present invention is not limited thereto.

Figure 35:
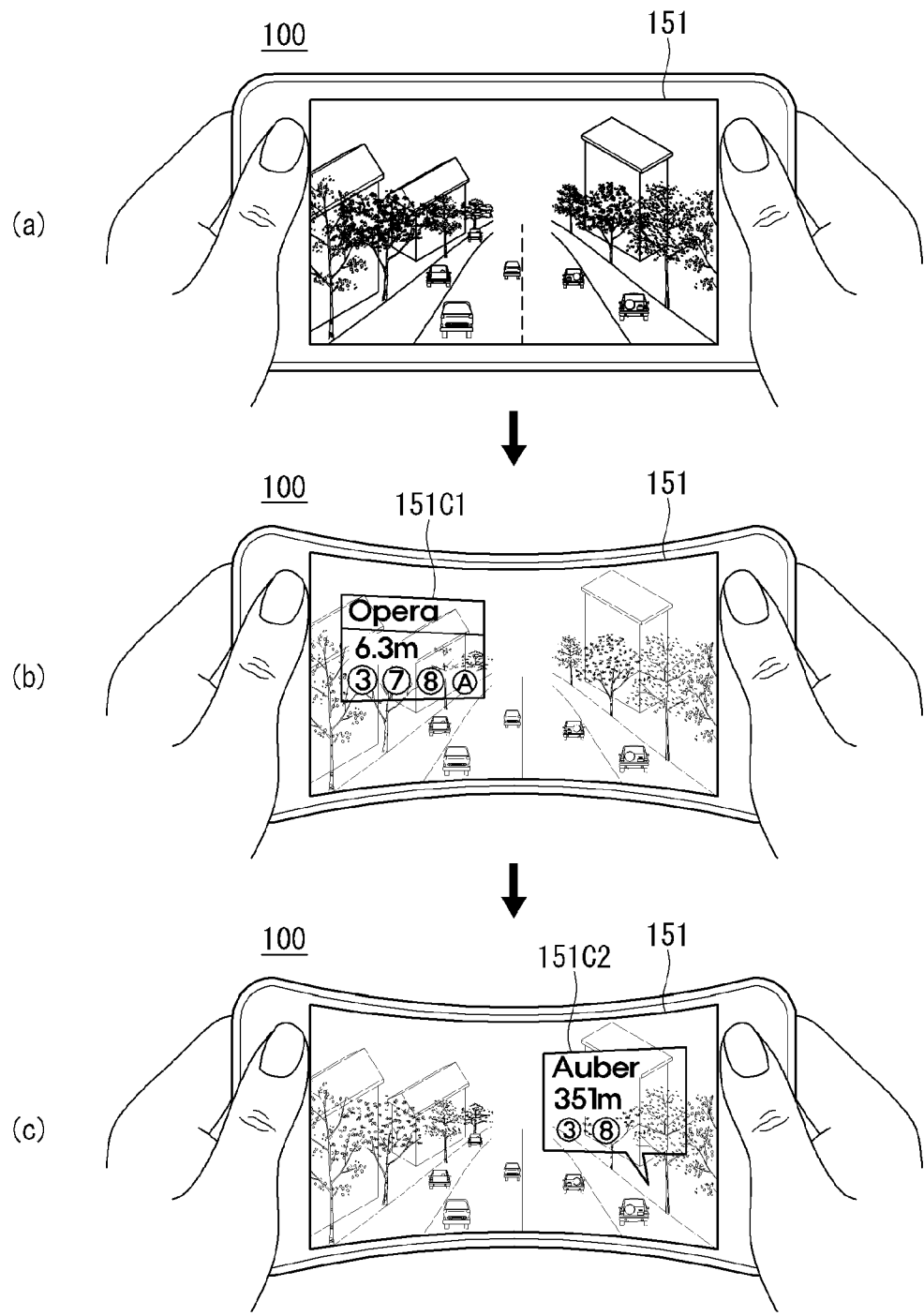
FIG. 35 is a view showing an example of changing an image showing execution results of a particular function with respect to an executed screen image of a particular application according to bending information regarding the display, according to the method for driving an electronic device illustrated in FIG. 34.

FIG. 35 is a view showing an example of changing an image showing execution results of a particular function with respect to an executed screen image of a particular application according to bending information regarding the display 151, according to the method for driving the electronic device 100 illustrated in FIG. 34.

FIG. 35(a) shows that a virtual reality application is executed to capture an image of a front side and display the same on the display 151. In the state of FIG. 35(a), the user applies force to bend the display 151.

Then, as shown in FIG. 35(b), the display 151 is bent in the opposite direction of the user, and the controller 180 sets a distance, i.e., a parameter, used for providing information regarding a building in the virtual reality application such that it is within 300 meters based on the bending information of the display 151.

Thereafter, the controller 180 further displays information 151C1 regarding a building located within 300 meters among buildings included in the image obtained by capturing the front side on the display 151. In this case, however, the controller 180 does not display information 151C2 regarding a building located beyond 300 meters among the buildings included in the image obtained by capturing the front side.

In the state of FIG. 35(b), the user applies force to bend the display 151. Then, as shown in FIG. 35(c), the display 151 is further bent in the opposite direction of the user and the controller 180 changes the distance as a parameter used for providing information regarding a building in the virtual reality application to 300 meters to 600 meters based on a bending degree of the display 151.

Thereafter, the controller 180 additionally displays the information 151C2 regarding the building located beyond the 300 meters among the building included in the image obtained by capturing the front side on the display 151. In this case, however, the controller 180 does not display the information 151C1 regarding the building located within 300 meters among the buildings included in the image obtained by capturing the front side.

In the above, with reference to FIGS. 34 and 35, the case in which an image showing the execution results of the particular function of the particular application with respect to the executed screen image of the particular application is changed according to a bending degree of the display 151 in the electronic device 100 according to an embodiment of the present invention has been described.

However, coverage of the present invention is not limited thereto. For example, the electronic device 100 according to an embodiment of the present invention may change an image showing execution results of the particular function of the particular application with respect to the executed screen image of the particular application to reflect a bending maintaining duration, the number of times of bending, and the like.

Figure 36:
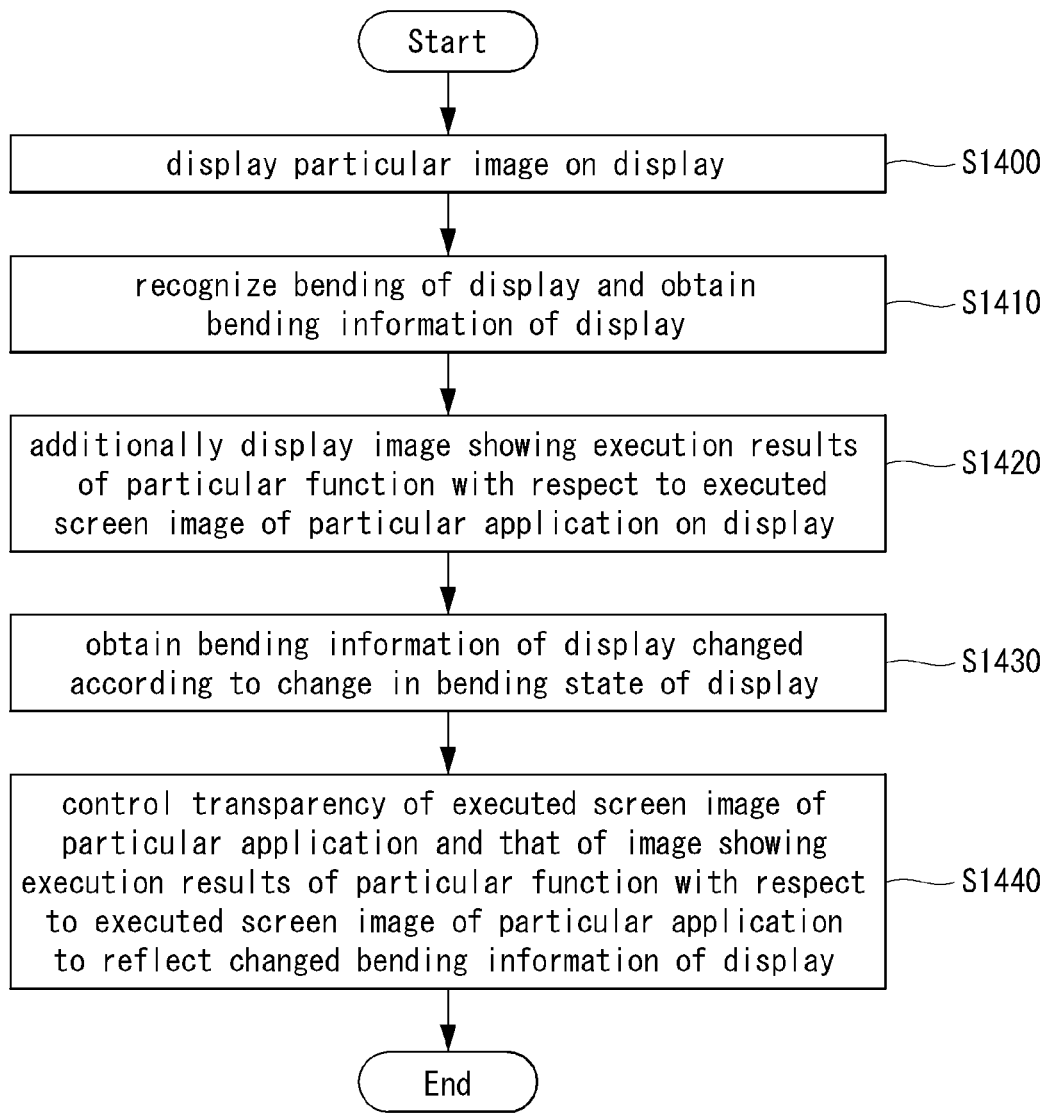
FIG. 36 is a flow chart illustrating an example of the method for driving an electronic device illustrated in FIG. 32.

FIG. 36 is a flow chart illustrating an example of the method for driving the electronic device 100 illustrated in FIG. 32. A method for driving the electronic device 100 will be described with reference to relevant drawings.

Steps S1400 to S1430 in FIG. 36 are similar to steps S1300 to S1330 in FIG. 34, so a detailed description of steps S1400 to S1430 will be omitted.

When bending information of the display 151 changed according to the steps is obtained, the controller 180 controls transparency of an executed screen image of a particular application and that of an image showing execution results of a particular function of the particular application with respect to the executed screen image of the particular application to reflect changed bending information of the display 151 (S1440). For example, the controller 180 may complementarily change transparency of the executed screen image of the particular application and that of the image showing execution results of a particular function of the particular application with respect to the executed screen image of the particular application to reflect changed bending information of the display 151.

Figure 37:
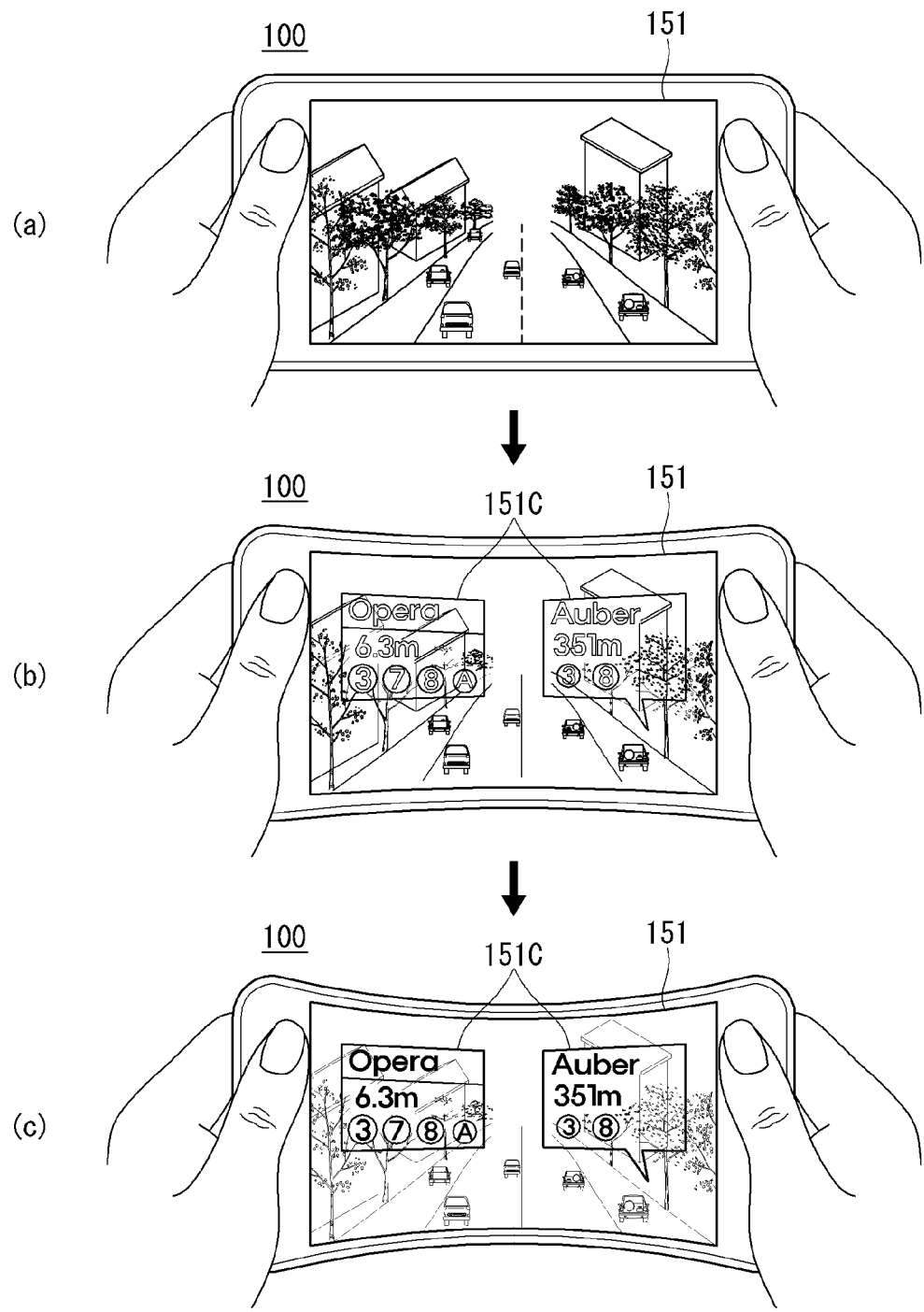
FIG. 37 is a view showing an example of changing an image showing execution results of a particular function with respect to an executed screen image of a particular application according to bending information regarding the display, according to the method for driving an electronic device illustrated in FIG. 36.

FIG. 37 is a view showing an example of changing an image showing execution results of a particular function with respect to an executed screen image of a particular application according to bending information regarding the display, according to the method for driving the electronic device 100 illustrated in FIG. 36.

FIG. 37(a) shows that a virtual reality application is executed to capture an image of a front side and display the same on the display 151. In the state of FIG. 37(a), the user applies force to bend the display 151.

Then, as shown in FIG. 37(b), the display 151 is bent in the opposite direction of the user, and the controller 180 additionally displays information 151C regarding buildings included in the image obtained by capturing the front side on the display 151.

In the state of FIG. 37(b), the user applies force to bend the display 151. Then, as shown in FIG. 37(c), the display 151 is further bent in the opposite direction of the user and the controller 180 reduces transparency of the information 151C regarding the buildings included in the image obtained by capturing the front side. Then, the user can well recognize the information 151C regarding the buildings.

Unlike the case illustrated in FIG. 36, the controller 180 may decrease transparency of the image obtained by capturing the front side, while increasing transparency of the information 151C regarding the buildings to reflect a bending degree.

Although not shown, the controller 180 may change the particular function of the particular application according to a bending maintaining duration at a particular bending degree of the display 151, while complementarily changing transparency of the executed screen image of the particular application and that of the image showing the execution results of the particular function of the particular application according to bending information of the display 151.

Also, the controller 180 may change the particular function of the particular application according to a change in a bending degree of the display 151, while complementarily changing transparency of the executed screen image of the particular application and that of the image showing the execution results of the particular function of the particular application according to a bending maintaining duration at a particular bending degree of the display 151.

Figure 38:
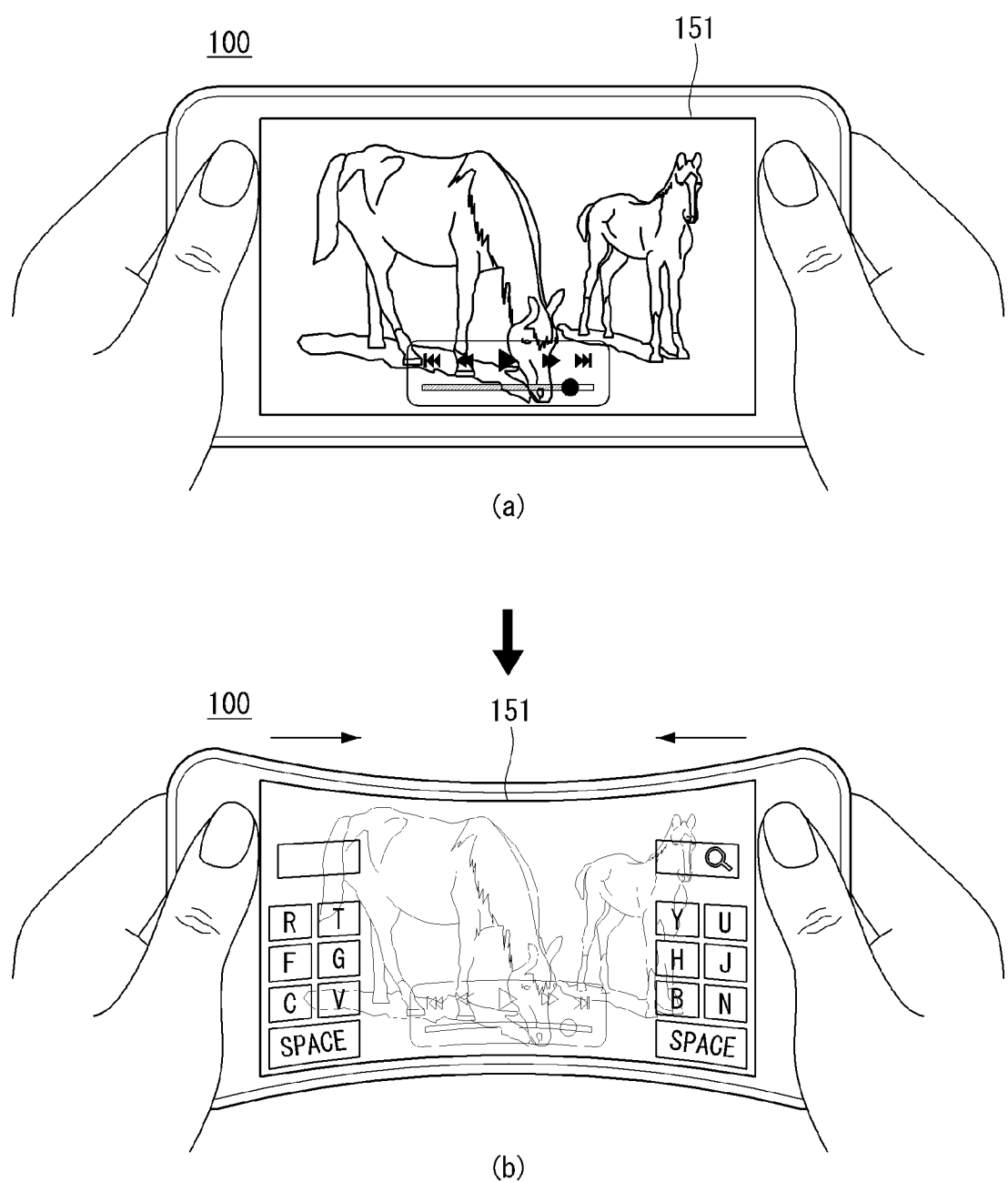
FIG. 38 is a view showing an example of displaying an additional image on the display based on bending of the display, according to the method for driving an electronic device according to an embodiment of the present invention.

FIG. 38 is a view showing an example of displaying an additional image on the display based on bending of the display 151, according to the method for driving the electronic device 100 according to an embodiment of the present invention.

FIG. 38(a) shows that an executed screen image of the video play application is displayed on the display 151. In the state of FIG. 38(a), the user bends the display 151. Then, as shown in FIG. 38(b), the controller 180 of the electronic device may display the executed screen image of the Web browsing application such that it is widened at both sides of the display 151.

FIG. 39 is a view showing another example of displaying an additional image on the display based on bending of the display, according to the method for driving the electronic device 100 according to an embodiment of the present invention.

FIG. 39(a) shows that the executed screen image of the video play application is displayed on the display 151. In the state of FIG. 39(a), when a message reception is recognized, as shown in FIG. 39(b), the controller 180 of the electronic device 100 displays a notification icon 151D on the display 151.

In the state of FIG. 39(b), the user bends the display 151. Then, as shown in FIG. 39(c), the controller 180 of the electronic device 100 displays such a display region of an executed screen image of a text message application is gradually widened starting from the middle of the display 151. In this case, the controller 180 may stop the execution of the video application. In the state of FIG. 39(c), when the user releases the bending, as shown in FIG. 39(d), the controller 180 may play the video again.

Meanwhile, the method for displaying an additional image based on bending of the display 151 is not limited to the examples illustrated in FIGS. 38 and 39. For example, a display region of an additional image may be widened starting from one of the left and right sides of the display 151, like a curtain, or may be gradually widened starting from one of upper and lower portions of the display 151.

The respective methods for driving the electronic device 100 according to embodiments according to the present invention as described above may be implemented in the form of programs which can be executed by various computer means, and recorded on a computer-readable medium. The computer-readable medium may include program commands, data files, data structures, and the like, alone, or a combination thereof. Programs recorded in the medium may be particularly designed and configured for the present invention or known to be available to those skilled in computer software.

Examples of the computer-readable recording medium include hardware devices, particularly configured to store and perform program commands, such as, magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. Programs may include, for example, a high-level language code that can be executed by a computer using an interpreter, as well as a machine language code made by a complier. The hardware devices may be configured to be operated by one or more software modules to implement the present invention, and vice versa.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

What is claimed is:

1. An electronic device comprising:
a flexible display;
a sensing unit configured to obtain a number of bending times of the flexible display; and
a controller configured to:
display a first image with a first transparency and a second image with a second transparency on the flexible display when the flexible display is in a flat state,
wherein the first transparency is 0% and the second transparency is 100% in the flat state,
wherein each time a bending of the flexible display is detected in a bending state, the first transparency is increased by a preset amount to a first value and the second transparency is complementarily reduced by the preset amount to a second value according to each bending,
wherein each time the flexible display is restored to the flat state from the bending state, the first transparency of the first image and the second transparency of the second image are maintained as the respective first and second values by the preset amount,
wherein when the number of bending times is increased to a predetermined number, the first image is finally invisible with 100% transparency and the second image is finally full-visible with 0% transparency, and
wherein the preset amount is 20% such that each time the flexible display is bent, the first transparency of the first image is increased by 20% and the second transparency of the second image is reduced by 20%.

2. The electronic device of claim 1, wherein when the first transparency is lower than a predetermined threshold value, the controller activates a first application related to the first image and when the first transparency is equal to or higher than the predetermined threshold value, the controller deactivates the first application related to the first image and activates a second application related to the second image.

3. The electronic device of claim 2, wherein the predetermined threshold value is 50% such that if the first transparency is lower than 50%, the controller activates first application related to the first image and deactivates the second application related to the second image.

4. The electronic device of claim 2, wherein the predetermined threshold value is 50% such that if the first transparency is equal to or higher than 50%, the controller deactivates the first application related to the first image and activates the second application related to the second image.

5. An electronic device comprising:
a flexible display;
a sensing unit configured to obtain a number of bending times of the flexible display; and
a controller configured to:
display a first image with a first transparency and a second image with a second transparency on the flexible display when the flexible display is in a flat state, wherein the first transparency is 0% and the second transparency is 100% in the flat state,
wherein each time a bending of the flexible display is detected in a bending state, the first transparency is increased by a preset amount and the second transparency is complementarily reduced by the preset amount according to each bending,
wherein each time the flexible display is restored to the flat state from the bending state, the first transparency of the first image and the second transparency of the second image are maintained as is, and
wherein the preset amount is fixed to a predetermined value such that each time the flexible display is bent, the first transparency of the first image is increased by the predetermined value and the second transparency of the second image is reduced by the predetermined value.

6. An electronic device comprising:
a flexible display;
a sensing unit configured to obtain a number of bending times of the flexible display; and
a controller configured to:
display a first image with a first transparency on the flexible display when the flexible display is in a flat state and activate a first application related to the first image, wherein when a bending of the flexible display is detected in a bending state, the controller further displays a second image with a second transparency, wherein each time the bending of the flexible display is detected, the first transparency is increased by a preset amount and the second transparency is complementarily reduced by the preset amount according to each bending, wherein each time the flexible display is restored to the flat state from the bending state, the first transparency of the first image and the second transparency of the second image are maintained as is, and wherein the preset amount is fixed to a predetermined value such that each time the flexible display is bent, the first transparency of the first image is increased by the predetermined value and the second transparency of the second image is reduced by the predetermined value.

7. The electronic device of claim 6, wherein when the first transparency is lower than a predetermined threshold value, the controller maintains the first application related to the first image and when the first transparency is equal to or higher than the predetermined threshold value, the controller deactivates the first application related to the first image and activates a second application related to the second image.

\* \* \* \* \*